United States Patent
Sahlin et al.

(10) Patent No.: US 10,764,880 B2
(45) Date of Patent: Sep. 1, 2020

(54) CONFIGURATION OF DOWNLINK TRANSMISSIONS

(71) Applicant: Telefonaktiebolaget LM Ericsson (publ), Stockholm (SE)

(72) Inventors: Henrik Sahlin, Mölnlycke (SE); Jingya Li, Göteborg (SE); Gustav Wikström, Täby (SE); Niklas Andgart, Södra Sandby (SE); Laetitia Falconetti, Järfälla (SE); Daniel Larsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/099,865

(22) PCT Filed: May 12, 2017

(86) PCT No.: PCT/SE2017/050481
§ 371 (c)(1),
(2) Date: Nov. 8, 2018

(87) PCT Pub. No.: WO2017/196245
PCT Pub. Date: Nov. 16, 2017

(65) Prior Publication Data
US 2019/0116583 A1     Apr. 18, 2019

Related U.S. Application Data

(60) Provisional application No. 62/374,269, filed on Aug. 12, 2016, provisional application No. 62/336,249, filed on May 13, 2016.

(51) Int. Cl.
*H04W 72/04* (2009.01)
*H04L 5/00* (2006.01)

(52) U.S. Cl.
CPC ........... *H04W 72/042* (2013.01); *H04L 5/003* (2013.01); *H04L 5/0007* (2013.01);
(Continued)

(58) Field of Classification Search
CPC ............ H04W 72/042; H04W 72/0446; H04L 5/0007; H04L 5/003; H04L 5/0044;
(Continued)

(56) References Cited

U.S. PATENT DOCUMENTS 10,064,165 B2    8/2018   Xu et al.
2010/0285810 A1*  11/2010  Ko .................. H04B 7/024
                                                455/450
(Continued)

FOREIGN PATENT DOCUMENTS

EP    3496485 A1    6/2019
WO    2016064049 A1   4/2016
(Continued)

OTHER PUBLICATIONS

Ericsson, "On the Operation with Different TTI Lengths," 3GPP TSG-RAN WG1 #86, R1-167496, Goteborg, Sweden, Aug. 22-26, 2016 (Year: 2016).*
(Continued)

*Primary Examiner* — Brian P Cox
(74) *Attorney, Agent, or Firm* — Withrow & Terranova, PLLC

(57) ABSTRACT

There is presented a method for providing configuration for downlink transmission to a wireless device. The method is performed by a network node and comprises transmitting a Downlink Control Information (DCI) message comprising configuration for downlink transmission in a short Transmission Time Interval (sTTI). Network nodes, wireless terminals, computer programs, and computer program products thereof are also presented.

46 Claims, 19 Drawing Sheets

(52) U.S. Cl.
CPC .......... *H04L 5/0044* (2013.01); *H04L 5/0048* (2013.01); *H04L 5/0053* (2013.01); *H04L 5/0064* (2013.01); *H04L 5/0091* (2013.01); *H04L 5/0092* (2013.01); *H04L 5/0094* (2013.01); *H04W 72/0446* (2013.01)

(58) Field of Classification Search
CPC ... H04L 5/0048; H04L 5/0053; H04L 5/0064; H04L 5/0091; H04L 5/0092; H04L 5/0094

See application file for complete search history.

(56) References Cited

U.S. PATENT DOCUMENTS

| | | | |
|---|---|---|---|
| 2011/0280177 A1 | 11/2011 | Horiuchi et al. | |
| 2014/0071954 A1* | 3/2014 | Au | H04W 72/0446 370/336 |
| 2015/0181574 A1 | 6/2015 | Lee et al. | |
| 2015/0181640 A1 | 6/2015 | Kwong et al. | |
| 2016/0143008 A1 | 5/2016 | Lee et al. | |
| 2016/0143030 A1 | 5/2016 | Lee et al. | |
| 2017/0290008 A1 | 10/2017 | Tooher et al. | |
| 2018/0048440 A1 | 2/2018 | Yang et al. | |
| 2018/0167933 A1 | 6/2018 | Yin et al. | |
| 2018/0206232 A1 | 7/2018 | Takeda et al. | |
| 2018/0227907 A1 | 8/2018 | Hosseini et al. | |
| 2019/0037585 A1 | 1/2019 | Li et al. | |
| 2019/0082457 A1 | 3/2019 | Zhou et al. | |
| 2019/0141681 A1* | 5/2019 | Wang | H04L 1/0007 |
| 2019/0150171 A1 | 5/2019 | Hwang et al. | |
| 2019/0165894 A1 | 5/2019 | Choi et al. | |
| 2019/0174492 A1 | 6/2019 | Gao et al. | |
| 2019/0174495 A1 | 6/2019 | Sahlin et al. | |
| 2019/0182810 A1 | 6/2019 | Gao et al. | |
| 2019/0190763 A1 | 6/2019 | Takeda et al. | |
| 2019/0223204 A1 | 7/2019 | Kim et al. | |
| 2019/0230659 A1 | 7/2019 | Sahlin et al. | |

FOREIGN PATENT DOCUMENTS

| | | | |
|---|---|---|---|
| WO | WO-2016064049 A1 * | 4/2016 | H04L 1/00 |
| WO | 2016142136 A1 | 9/2016 | |

OTHER PUBLICATIONS

Ericsson, "R1-163322: Downlink control signaling design for short TTI," 3GPP TSG RAN WG1 Meeting #84bis, Apr. 11-15, 2016, Busan, 4 pages.

Ericsson, "R1-167496: On the operation with different TTI lengths," 3GPP TSG-RAN WG1 #86, Aug. 22-16, 2016, Göteborg, Sweden, 6 pages.

Huawei, "R1-162588: DCI design for short TTI," 3GPP TSG RAN WG1 Meeting #84bis, Apr. 11-15, 2016, Busan, Korea, 11 pages.

LG Electronics, "R1-162511: Physical layer aspect of processing time for shortened TTI," 3GPP TSG RAN WG1 Meeting #84bis, Apr. 11-15, 2016, Busan, Korea, 6 pages.

LG Electronics, "R1-163101: Support different TTI length for data channels and PUCCH," 3GPP TSG RAN WG1 Meeting #84bis, Apr. 11-15, 2016, Busan, Korea, 4 pages.

Office Action for Indonesian Patent Application No. P-00 2018 09145, dated Sep. 17, 2019, 4 pages.

Search Report for Japanese Patent Application No. 2018-559695, dated Aug. 14, 2019, 45 pages.

Notice of Reasons for Refusal for Japanese Patent Application No. 2018-559695, dated Aug. 20, 2019, 10 pages.

Non-Final Office Action for U.S. Appl. No. 16/367,717, dated Jul. 3, 2019, 8 pages.

Ericsson, "R1-165299: On the operation with different TTI lengths," 3GPP TSG-RAN WG1 #85, May 23-27, 2016, Nanjing, P.R. China, 5 pages.

Official Action for Russian Patent Application No. 2018143926, dated Apr. 24, 2019, 8 pages.

International Search Report and Written Opinion for International Patent Application No. PCT/SE2017/050820, dated Oct. 16, 2017, 10 pages.

Author Unknown, "Technical Specification Group Radio Access Network; Evolved Universal Terrestrial Radio Access (E-UTRA); Multiplexing and channel coding (Release 13)," Technical Specification 36.212, Version 13.1.0, 3GPP Organizational Partners, Mar. 2016, 129 pages.

Ericsson, "R1-163323: Definition of DCI bit fields for short TTI," Third Generation Partnership Project (3GPP), TSG RAN WG1 Meeting #84bis, Apr. 11-15, 2016, 5 pages, Busan, Korea.

Zte, "R1-162405: Downlink control channels for shortened TTI," Third Generation Partnership Project (3GPP), TSG RAN WG1 Meeting #84bis, Apr. 11-15, 2016, 7 pages, Busan, Korea.

International Search Report and Written Opinion for International Patent Application No. PCT/SE2017/050481, dated Jul. 31, 2017, 14 pages.

International Preliminary Report on Patentability for International Patent Application No. PCT/SE2017/050481, dated Apr. 16, 2018, 19 pages.

First Action Interview Pilot Program Pre-Interview Communication for U.S. Appl. No. 16/367,717, dated Nov. 5, 2019, 4 pages.

* cited by examiner

(a) 2os DL TTI

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 1os PDCCH | R | | | | R | C | | C | R | | C | C | R | C | C |
| sTTI | | 0 | | 1 | | 2 | | 3 | | 4 | | 5 | | |
| 2os PDCCH | R | | | | R | C | | C | R | | C | C | R | C | C |
| sTTI | | | 0 | | 1 | | 2 | | 3 | | 4 | | | |
| 3os PDCCH | R | | | | R | C | | C | R | | C | C | R | C | C |
| sTTI | | | 0 | | 1 | | 2 | | 3 | | 4 | | | |

(b) 7os DL TTI

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 1os PDCCH | R | | | | | R | C | C | R | C | C | R | C | C |
| sTTI | | 0 | | | | | | | 1 | | | | | |
| 2os PDCCH | R | | | | | R | C | C | R | C | C | R | C | C |
| sTTI | | 0 | | | | | | | 1 | | | | | |
| 3os PDCCH | R | | | | | R | C | C | R | C | C | R | C | C |
| sTTI | | | 0 | | | | | | 1 | | | | | |

Fig. 18

7 symbol sTTI

4 symbol sTTI

2 symbol sTTI

2os UL TTI

4os UL TTI

7os UL TTI

CONFIGURATION OF DOWNLINK TRANSMISSIONS

This application is a 35 U.S.C. § 371 national phase filing of International Application No. PCT/SE2017/050481, filed May 12, 2017, which claims the benefit of U.S. Provisional Application No. 62/336,249, filed May 13, 2016, and U.S. Provisional Application No. 62/374,269, filed Aug. 12, 2016, the disclosures of which are incorporated herein by reference in their entireties.

TECHNICAL FIELD

The invention relates to a method for configuration of downlink transmission, and a network node, a wireless device, a computer program and a computer program product thereof.

BACKGROUND

One parameter in providing good performance and capacity for a given communications protocol in a communications network is packet data latency. Latency measurements can be performed in all stages of the communications network, for example when verifying a new software release or system component, and/or when deploying the communications network and when the communications network is in commercial operation.

Shorter latency than previous generations of 3GPP radio access technologies was one performance metric that guided the design of Long Term Evolution (LTE), corresponding to 3GPP Release 8 or higher. End user now recognize LTE as a system that provides faster access to the Internet and lower packet latency than previous generations.

Packet latency is also a parameter that indirectly influences the throughput of the communications network. Traffic using the Hypertext Transfer Protocol (HTTP) and/or the Transmission Control Protocol (TCP) is currently one of the dominating application and transport layer protocol suite used on the Internet. The typical size of HTTP based transactions over the Internet is in the range of a few tens of kilobytes up to 1 megabyte. In this size range, the slow start period of the TCP represents a significant part of the total transport period of the packet stream. During the TCP start period, the performance is packet latency limited. Hence, improved packet latency can potentially improve the average throughput, at least for this type of TCP-based data transactions.

Radio resource efficiency could also be positively impacted by packet latency reductions. Lower packet data latency could increase the number of transmissions possible within a certain delay bound; hence higher Block Error Rate (BLER) targets could be used for the data transmissions freeing up radio resources potentially improving the capacity of the system.

The existing physical layer downlink control channels, Physical Downlink Control Channel (PDCCH) and enhanced PDCCH (ePDCCH), are used to carry Downlink Control Information (DCI) such as scheduling decisions for uplink (UL; from device to network) and downlink (DL; from network to device) and power control commands. Both PDCCH and ePDCCH are according to present communications networks transmitted once per 1 ms subframe.

3GPP TS 36.212 lists examples of different DCI formats for UL and DL resource assignments. UL scheduling grants use either DCI format 0 or DCI format 4. The latter was added in the 3GPP for supporting uplink spatial multiplexing The existing way of operation, e.g. frame structure and control signalling, are designed for data allocations in subframes of a fixed length of 1 ms, which may vary only in allocated bandwidth. Specifically, the current DCIs define resource allocations within the entire subframe, and are only transmitted once per subframe. The existing way of operation does not indicate how scheduling of UL and DL data can be performed in a shorter time frame than a subframe, i.e., shorter than 1 ms.

Hence, there is a need to reduce signalling overhead and implementation complexity.

SUMMARY

An object of embodiments presented herein is to enable communications using a short transmission time interval.

According to a first aspect, there is presented a method for providing configuration for downlink transmission to a wireless device. The method is performed by a network node and comprises transmitting a Downlink Control Information (DCI) message comprising configuration for downlink transmission in a short Transmission Time Interval (sTTI).

By virtue of the configuration contained in the DCI message, it will be possible to adapt the properties of the transmission employing sTTI to changing conditions, while maintaining the network node and the wireless device aligned.

The TTIs are shortened (in relation to legacy TTIs), wherein each sTTI can be shorter in time than a subframe and each sTTI comprises at least on symbol period The DCI message may be transmitted in a TTI frequency band for sTTI.

The configuration may comprise position of reference symbols and data symbols. The reference symbols may be downlink Demodulation Reference Signals (DMRS) or Cell-Specific Reference Symbol (CRS).

The configuration may comprise sTTI lengths. The sTTI length may be two or seven symbols.

The sTTIs may have a fixed length for each subframe.

The method may further comprise transmitting a data transmission to the wireless device on a short Physical Downlink Shared Channel (sPDSCH) according to the configuration of the DCI message.

The DCI may be a slow DCI message and may be sent on subframe basis. The slow DCI message may be sent to a group of wireless devices.

The DCI may be a fast DCI and the fast DCI message may be sent to a specific wireless device. The fast DCI message may be sent on a symbol basis or a sTTI basis.

The sTTIs may have a fixed pattern. The fixed starting symbol may be the first symbol within a subframe that DL sTTI data transmission can be performed. The fixed starting symbols may be selected in dependence on a control region of the DL subframe. The fixed starting symbol may be signaled by Physical Control Format Indicator Channel, PCFICH, or by Radio Resource Control, RRC.

The method may further comprise determining a sTTI pattern to be used. The determining may be based on latency requirements.

The sTTIs may have a first fixed pattern and a second fixed pattern.

The sTTI patterns may consist of symbol lengths 3, 2, 2, 2, 2 and 3 in consecutive order, or may consist of symbol lengths 2, 3, 2, 2, 2 and 3 in consecutive order.

The sTTI data transmissions following a starting symbol index of 1 or 3 may have a first pattern and the sTTI data transmissions following a starting symbol index of 2 may have a second pattern. The sTTI patterns may consist of symbol lengths 3, 2, 2, 2, 2 and 3 in consecutive order following a starting symbol index of 1 or 3, and may consist of symbol lengths 2, 3, 2, 2, 2 and 3 in consecutive order following a starting symbol index of 2 have a second pattern.

The method may further comprise switching between different patterns between subframes.

According to a second aspect, a method for configuration of downlink transmission from a network node is presented. The method is performed by a wireless device and comprises receiving a DCI message comprising configuration for downlink transmission in a sTTI.

According to a third aspect, a method for providing configuration for downlink transmission to a wireless device is presented. The method is performed by a network node and comprises transmitting a Radio Resource Control (RRC) message comprising configuration for downlink transmission in a sTTI.

The RRC message may be transmitted in a TTI frequency band for sTTI.

The configuration may comprise lengths of sTTIs.

According to a fourth aspect, a method for configuration of downlink transmission from a network node is presented. The method is performed by a wireless device and comprises receiving a RRC message comprising configuration for downlink transmission in a sTTI.

According to a fifth aspect, a network node for providing configuration for downlink transmission to a wireless device is presented and comprises a processor and a computer program product. The computer program product stores instructions that, when executed by the processor, causes the network node to transmit a DCI message comprising configuration for downlink transmission in a sTTI.

According to a sixth aspect, a wireless device for configuration of downlink transmission from a network node is presented and comprises a processor and a computer program product. The computer program product stores instructions that, when executed by the processor, causes the wireless device to receive a DCI message comprising configuration for downlink transmission in a sTTI.

According to a seventh aspect, a network node for providing configuration for downlink transmission to a wireless device is presented and comprises a processor and a computer program product. The computer program product stores instructions that, when executed by the processor, causes the network node to transmit RRC message comprising configuration for downlink transmission in a sTTI.

According to an eighth aspect, a wireless device for configuration of downlink transmission from a network node is presented and comprises a processor and a computer program product. The computer program product stores instructions that, when executed by the processor, causes the wireless device to receive a RRC message comprising configuration for downlink transmission in a sTTI.

According to a ninth aspect, a network node for providing configuration for downlink transmission to a wireless device is presented. The network node comprises a communication manager for transmitting a DCI message comprising configuration for downlink transmission in a sTTI.

According to a tenth aspect, a wireless device for configuration of downlink transmission from a network node is presented. The wireless device comprises a communication manager for receiving a DCI message comprising configuration for downlink transmission in a sTTI.

According to an eleventh aspect, a network node for providing configuration for downlink transmission to a wireless device is presented. The network node comprises a communication manager for transmitting a RRC message comprising configuration for downlink transmission in a short Transmission Time Interval.

According to a twelfth aspect, a wireless device for configuration of downlink transmission from a network node is presented. The wireless device comprises a communication manager for receiving a RRC message comprising configuration for downlink transmission in a sTTI.

According to a thirteenth aspect, a computer program for providing configuration for downlink transmission to a wireless device is presented. The computer program comprises computer program code which, when run on a network node, causes the network node to transmit a DCI message comprising configuration for downlink transmission in a sTTI.

According to a fourteenth aspect, a computer program for configuration of downlink transmission from a network node is presented. The computer program comprises computer program code which, when run on a wireless terminal, causes the wireless terminal to receive a DCI message comprising configuration for downlink transmission in a sTTI.

According to a fifteenth aspect, a computer program for providing configuration for downlink transmission to a wireless device is presented. The computer program comprises computer program code which, when run on a network node, causes the network node to transmit a RRC message comprising configuration for downlink transmission in a sTTI.

According to a sixteenth aspect, a computer program for configuration of downlink transmission from a network node is presented. The computer program comprises computer program code which, when run on a wireless terminal, causes the wireless terminal to receive a RRC message comprising configuration for downlink transmission in a sTTI.

According to a seventeenth aspect, a computer program product comprises a computer program and a computer readable storage means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, on which:

FIGS. 3-9 schematically illustrate short TTI configurations in a subframe according to embodiments presented herein;

FIGS. 14-20 schematically illustrate short TTI configurations in a subframe according to embodiments presented herein.

DETAILED DESCRIPTION

Figure 1:
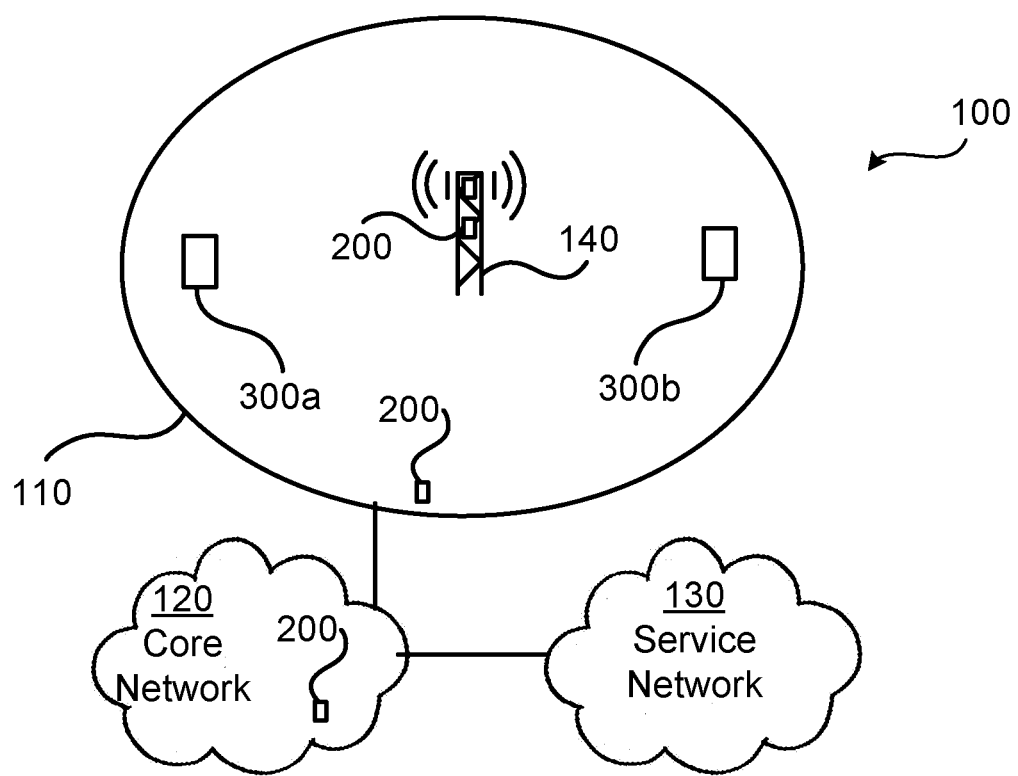
FIG. 1 is a schematic diagram illustrating a communication network wherein embodiments presented herein can be implemented.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Existing Physical Layer Downlink Control Channels (PDCCHs) and Enhanced PDCCHs (ePDCCHs) are transmitted once per 1 ms subframe.

A PDCCH is distributed over the whole carrier bandwidth, but is time multiplexed with Physical Downlink Shared Channel (PDSCH) over the first 1-4 symbols in the subframe.

An EPDCCH is distributed over the whole 1 ms subframe, but is frequency multiplexed with PDSCH and multiplexed onto one or multiple Physical Resource Block (PRB) pairs for localized and distributed transmission respectively.

PDCCH has a common search space where all User Equipments (UEs) need to detect common cell specific control information. Depending whether an UE has been configured for ePDCCH or not, it searches UE specific control information from UE search space of ePDCCH or PDCCH, respectively.

The size of a PDCCH region can change dynamically on subframe basis. The size of the PDCCH region is signalled on the Physical Control Format Indicator Channel (PCFICH) in the beginning of the 1 ms subframe.

The frequency domain allocation of the ePDCCH is semi-statically configured by means of higher layer signalling.

The current control channels carry control information, referred to as Downlink Control Information (DCI). There are several DCI formats which have different options depending on e.g. configured transmission mode. The DCI format has a Cyclic Redundancy Check (CRC) which is scrambled by a UE identifier, such as a Cell Radio Network Temporary Identifier (C-RNTI), and when the CRC match, after descrambling, a PDCCH with a certain DCI format has been detected. There are also identifiers that are shared by multiple terminals, such as the System Information (SI) RNTI which is used for transmission of system information.

There are currently a number of different DCI formats, see 3GPP TS 36.212 for DL resource assignments including format 1,1A,1B,1C, 1D, 2, 2A, 2B, 2C and 2D.

Format 1: single codeword transmission
  1 bit for indicating resource allocation type (type 0 or type 1)
  $\lceil N_{RB}^{DL}/P \rceil$ bits for the resource allocation (type 0 or type 1)
  3 bits for HARQ process number (4bits for Time Division Duplex (TDD))
  3 bits for new data indicator (NDI) and redundancy version (RV)
  5 bits for modulation and code scheme (MCS)

Format 1A, 1B, 1D: single codeword transmission
  $\lceil \log_2(N_{RB}^{DL}(N_{RB}^{DL}+1)/2) \rceil$ bits for the resource allocation (type 2)
  3 bits for HARQ process number (4 bits for TDD)
  3 bits for new data indicator (NDI) and redundancy version (RV)
  5 bits for modulation and code scheme (MCS)

Format 2, 2A, 2B, 2C, 2D: two codeword transmission
  $\lceil N_{RB}^{DL}/P \rceil$ bits for the resource allocation (type 0 or type 1)
  3 bits for HARQ process number (4bits for TDD)
  2×3 bits for new data indicator (NDI) and redundancy version (RV)
  2×5 bits for modulation and code scheme (MCS)

Here, P is the resource block group size which depends on the system bandwidth and $N_{RB}^{DL}$ the number of resource block in the downlink.

The DCI for a downlink scheduling assignment hence contains information on downlink data resource allocation in the frequency domain (the resource allocation), modulation and coding scheme (MCS) and Hybrid Automatic Repeat Request (HARQ) process information. In case of carrier aggregation, information related to which carrier the PDSCH is transmitted on may be included as well.

There are also DCI formats for Uplink (UL) grants, DCI format 0 and DCI format 4 as well as for power control commands, DCI formats 3 and 3A.

The existing way of operation, e.g. frame structure and control signalling, are designed for a fixed length of 1 ms data allocations, which may vary only in allocated bandwidth. Specifically, the current DCIs define resource allocations within the entire subframe. There is no obvious solution that allows dynamic configuration of the short TTI duration for downlink transmissions.

As mentioned, one way to reduce latency is to reduce the TTI, and instead of assigning resources with a time duration of 1 ms, there is then a need to assign resources with shorter duration such as a number of Orthogonal Frequency Division Multiple Access (OFDM) or Single Carrier-Frequency Division Multiple Access (SC-FDMA) symbols. This implies a need for UE specific control signalling that enables indication of such short scheduling assignments.

Furthermore, there is also a need to be able to dynamically switch between TTI duration, for example between legacy 1 ms TTIs as well as shorter TTIs, in order to optimize the spectral efficiency (since shorter TTIs may incur higher overhead and/or worse demodulation performance).

Short PDSCH (sPDSCH) and short PUSCH (sPUSCH) denote the downlink and uplink physical shared channels with short TTIs, respectively. Similarly, short PDCCH (sPDCCH) is used to denote downlink physical control channels with short TTIs.

A new DCI format may be defined to support short TTI configuration by introducing a time domain split field. However, such a new DCI formatted would be designed based on using PDCCH, which is transmitted only once per subframe. Therefore, short TTI scheduling decisions can only be made per subframe.

A DCI may be partitioned into fast DCI, which can vary between different sub-subframes, and slow DCI, which is changed at most once per subframe. The fast DCI is conveyed to the UE through a sPDCCH transmission. The UE monitors different sPDCCH candidate resources and tries to decode a sPDCCH transmission intended for itself. If successful, the fast DCI from the sPDCCH together with the slow DCI determines a sPDSCH DL assignment or (sPUSCH UL grant) for the UE. The use of fast grants provides the opportunity to signal control information, such as sPDSCH scheduling assignments more often than once per 1 ms, with smaller DCI payloads as compared to existing DCI formats, and only when needed.

In Demodulation Reference Signal (DMRS) based downlink transmissions, one or more OFDM symbols with DMRS transmitted for each short TTI leads to an increased overhead and a corresponding decrease in data rates, when the length of the TTI is reduced.

To reduce the overhead, downlink short sPDSCH do not necessarily contain DMRS if recent DMRS transmissions to the same UE have occurred. The presence of DMRS in a downlink short TTI is either signalled in the sPDCCH or the UE tries to blindly decode the transmission under the two assumptions that DMRS is present or not. This dynamic DMRS insertion can be also applied to sPUSCH for uplink transmissions within short TTIs.

As proposed in PCT/EP2016/053333 International Publication Number WO 2016/142136, each uplink/downlink sTTI transmission within a subframe may be scheduled by a dedicated fast DCI, which is user specific and transmitted on symbol basis, e.g. on sPDCCH. To allow a flexible sTTI configuration, the fast DCI contains a sTTI configuration field to indicate the position and length of the sPDSCH/sPUSCH. The main payload reduction in the fast DCI is then done with respect to the frequency domain resource allocation, which is conveyed by the slow DCI.

The proposed signalling solution allows flexible configuration of sTTIs transmissions, e.g. flexible TTI lengths within a subframe, and allows TTI lengths to be adapted to individual UE needs. However, it might also add more signalling overhead and an advanced HARQ design. When the signalling overhead and the implementation complexity is a concern, simplified downlink assignments and uplink scheduling grant needs to be designed while still supporting promising sTTI transmission functionalities, e.g. DMRS multiplexing for uplink transmissions, dynamic DMRS insertion for both downlink and uplink transmissions.

Embodiments presented herein support fixed or different TTI lengths and support dynamic DMRS insertion functionality, which can reduce the DMRS overhead and thus improve the resource utilization for downlink sTTI transmissions.

Another benefit of having fixed downlink sTTI patterns signalled to all sTTI UEs is that by detecting this information, the UEs then know where to search for sPDCCH, if the sPDCCH region is fixed in each DL sTTI, e.g., at the beginning of each DL sTTI.

A signalling method to support downlink sTTI transmissions is presented.

In an embodiment, the downlink sTTI configurations, i.e., the positions of data symbols and reference symbols, and the length of each TTI are fixed for each subframe for a UE.

In an embodiment, the downlink sTTI configurations, i.e. the positions of reference symbols and data symbols, and the length of each TTI are fixed for each subframe. The sTTI configuration is signalled by a slow DCI, which is transmitted on subframe basis in downlink, and it is possibly common for a group of users.

In an embodiment, a downlink sTTI transmission is scheduled by a fast DCI, which is user-specific and transmitted on a faster rate than one each sub-frame, e.g. on a symbol basis in DL.

In yet another embodiment the configuration of sTTI is given by RRC signalling or a combination of RRC signalling, slow and fast grant.

Some examples of downlink sTTI configurations are presented. The configurations are fixed for each subframe. For all configurations the boxes with "R" refer to OFDM symbols in which at least one sub-carrier contains cell-specific reference symbols.

Figure 4A:
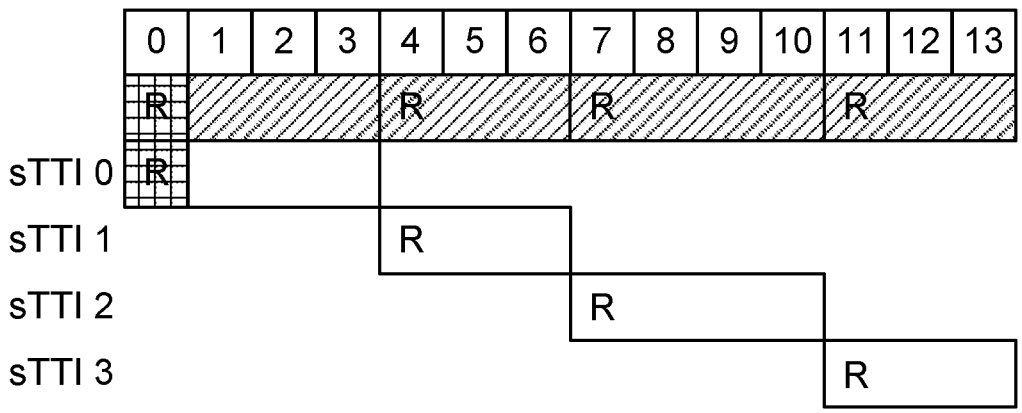
Figure 4B:
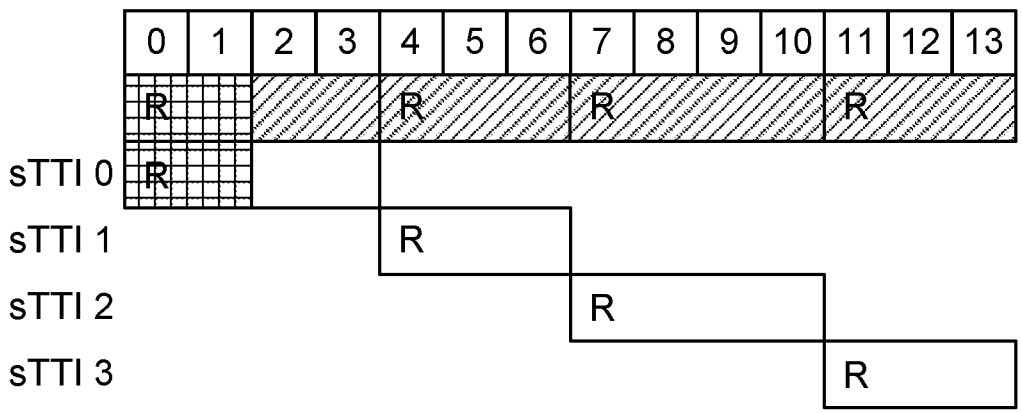
Figure 4C:
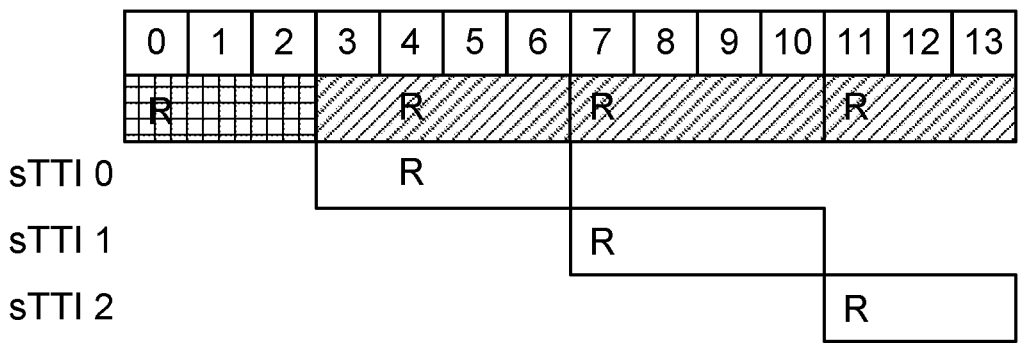
Figure 5A:
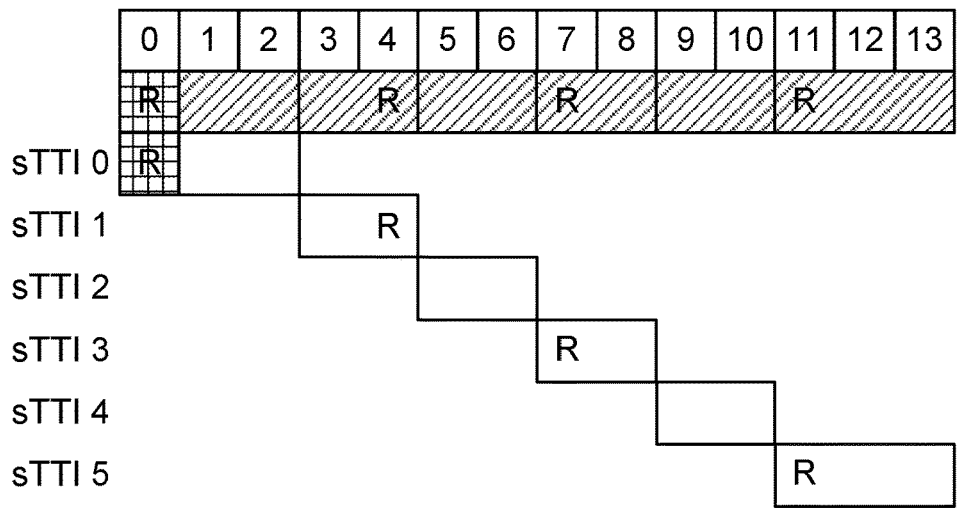
Figure 5B:
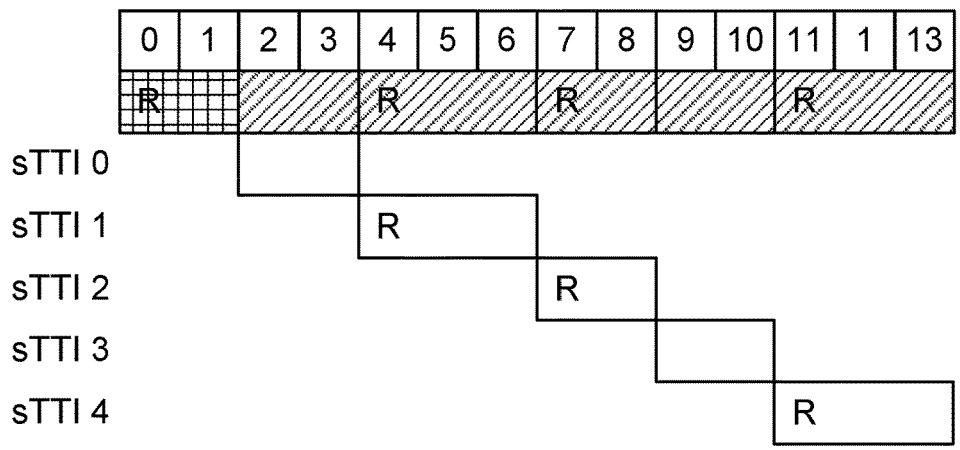
Figure 5C:
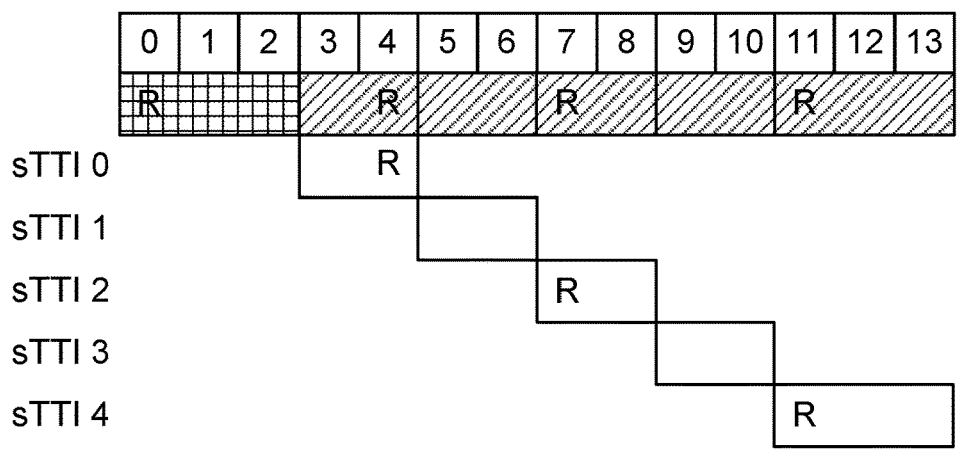

FIGS. 3-5 illustrate examples of sTTI configurations in a subframe with a sTTI length of 7 OFDM symbols, 3 or 4 OFDM symbols, and 2 or 3 OFDM symbols, respectively, for different sizes of the control region. For the 7 OFDM symbol sTTI configuration shown in FIG. 3, the legacy subframe is divided into two-symbol slots, and each slot forms a sTTI.

All configurations shown in FIGS. 3-5 are slot-contained, that is, there is no sTTI across the slot boundaries. Ending the sTTI at slot boarder allows for the opportunity of time-multiplexing of the sTTIs with different lengths. This results in a higher resource usage from the network node perspective.

Figure 3A:
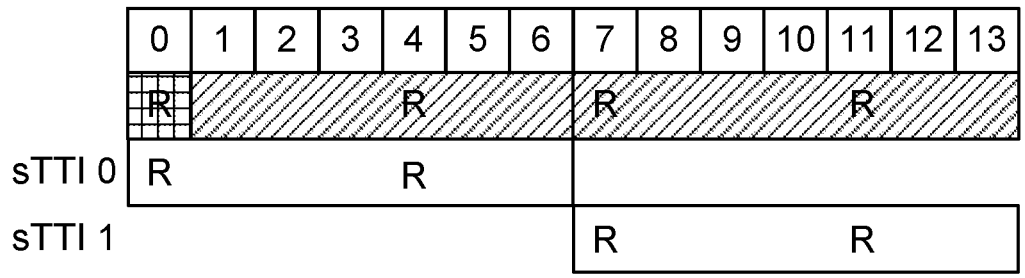
Figure 3B:
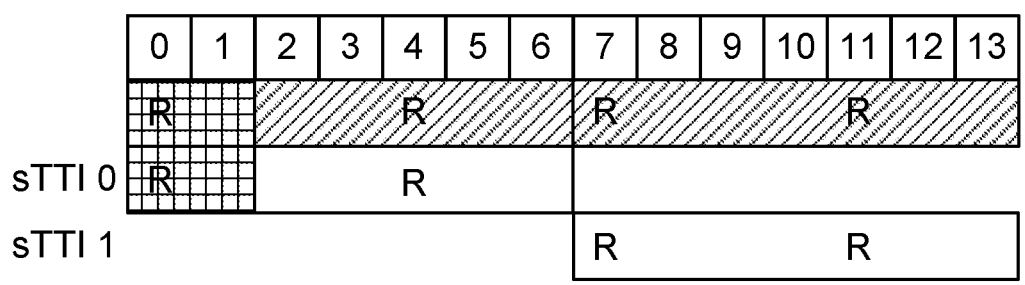
Figure 3C:
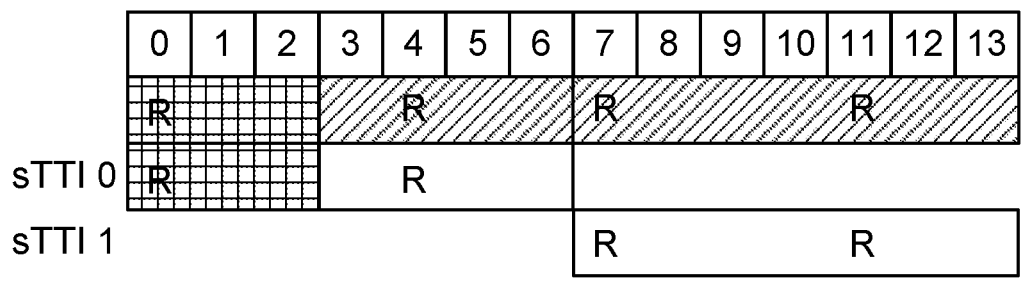

Examples of 7-symbol DL sTTI configurations in a subframe are presented in FIG. 3. In FIG. 3a the control region consists of one symbol. In FIG. 3b the control region consists of two symbols, and in FIG. 3c the control region consists of three symbols. The control region is marked with a grid, and the TTI is marked with dashes.

Examples of 3/4-symbol DL sTTI configurations in a subframe are presented in FIG. 4. In FIG. 4a the control region consists of one symbol. In FIG. 4b the control region consists of two symbols, and in FIG. 4c the control region consists of three symbols. The control region is marked with a grid, and the TTI is marked with dashes.

Examples of 3/4-symbol DL sTTI configurations in a subframe for different sizes of the control region have been presented in FIG. 4. Another way to allow for time-multiplexing of sTTIs with different lengths is to have a sTTI ending at the same OFDM symbol for all different configurations. This symbol does not necessarily need to be the last symbol of the first slot of a subframe.

FIGS. 6-8 illustrate another set of DL sTTI configurations for different sTTI lengths and different sizes of the control region of a subframe, which control region may be configured by PCFICH. Different sTTI configurations may be defined for different control region sizes. FIGS. a, b, and c correspond to control region of size on, two and three OFDM symbol period, respectively. For all configurations shown in FIGS. 6-8, there is a sTTI boundary between symbol 7 and symbol 8. Therefore, time-multiplexing between different TTI lengths can still be supported by switching sTTI patterns after the common boundary symbol. For example, the pattern for a 6/7 symbol sTTI shown in FIG. 6 can be applied in symbols 0-7, and the pattern for 2/3 symbol sTTIs shown in FIG. 8 is applied in symbols 8-13.

Figure 6A:
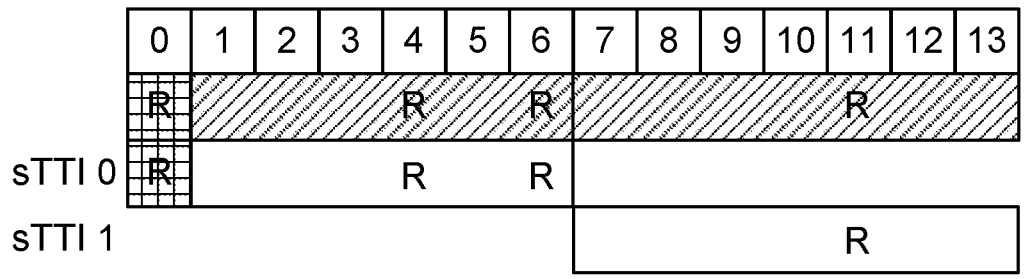
Figure 6B:
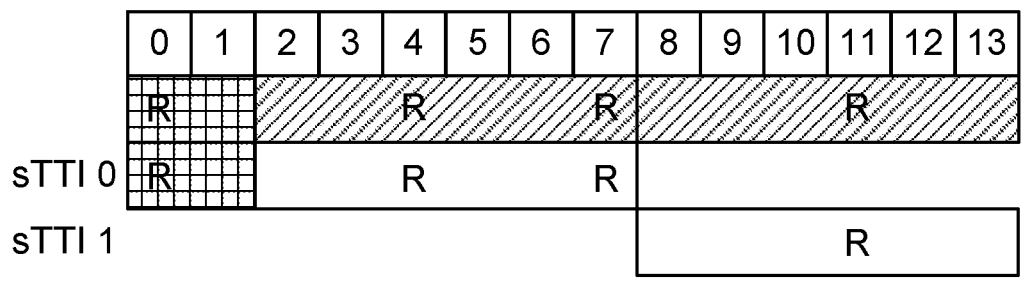
Figure 6C:
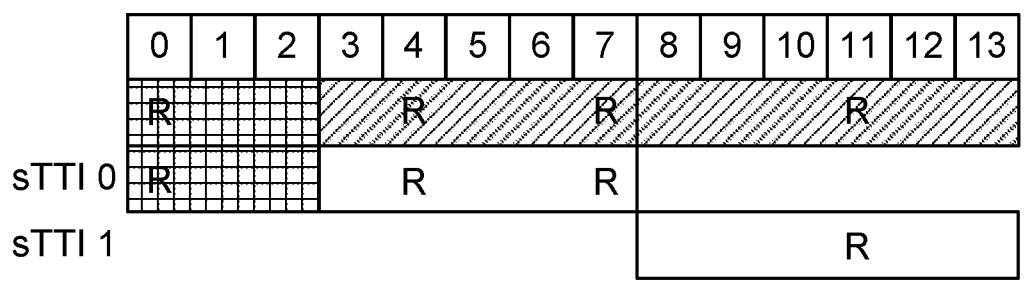

Examples of 6/7-symbol DL sTTI configurations in a subframe, with a sTTI boundary between symbol 7 and symbol 8, are presented in FIGS. 6a-6c.

Figure 7A:
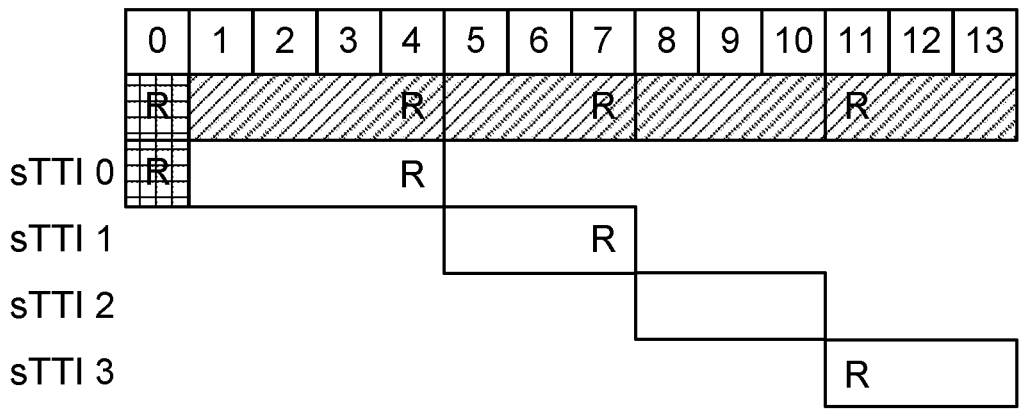
Figure 7B:
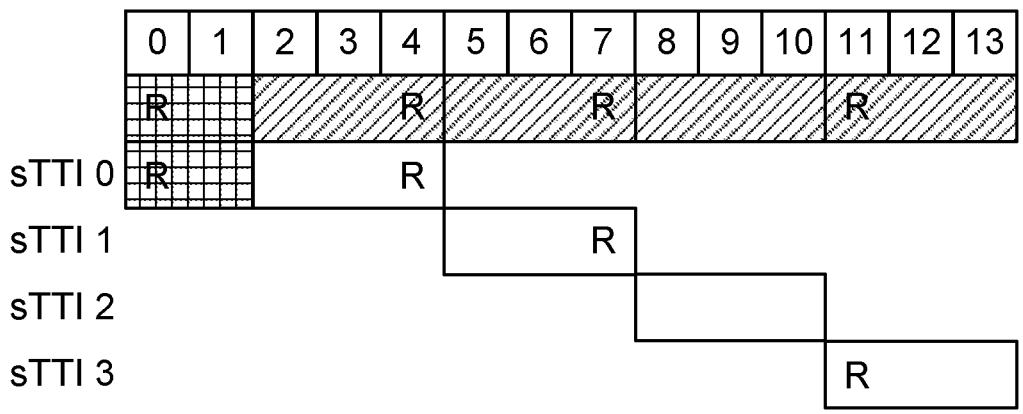
Figure 7C:
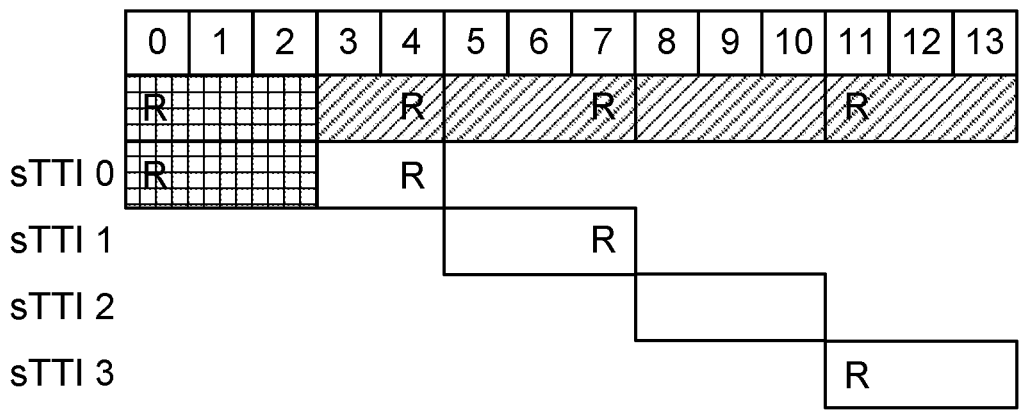

Examples of 3/4-symbol DL sTTI configurations in a subframe, with a sTTI boundary between symbol 7 and symbol 8, are presented in FIGS. 7a-7c.

Figure 8A:
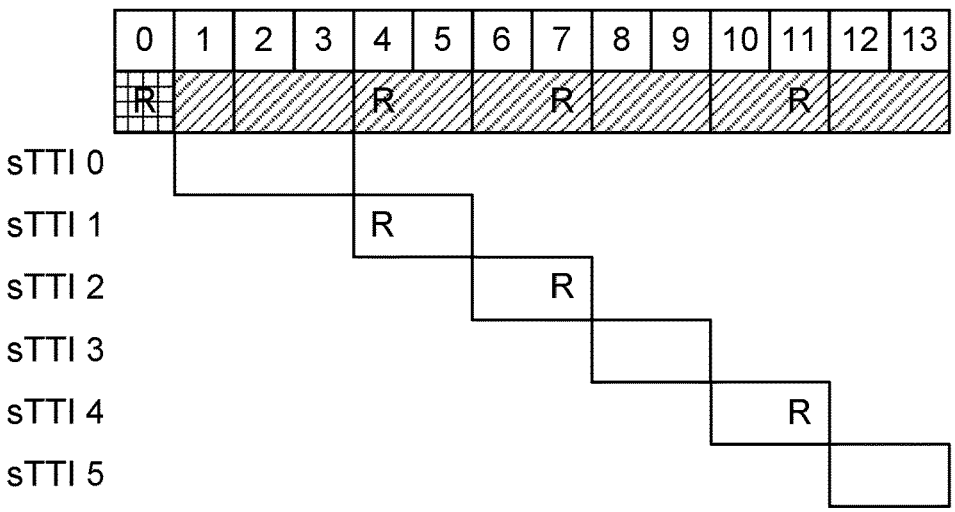
Figure 8B:
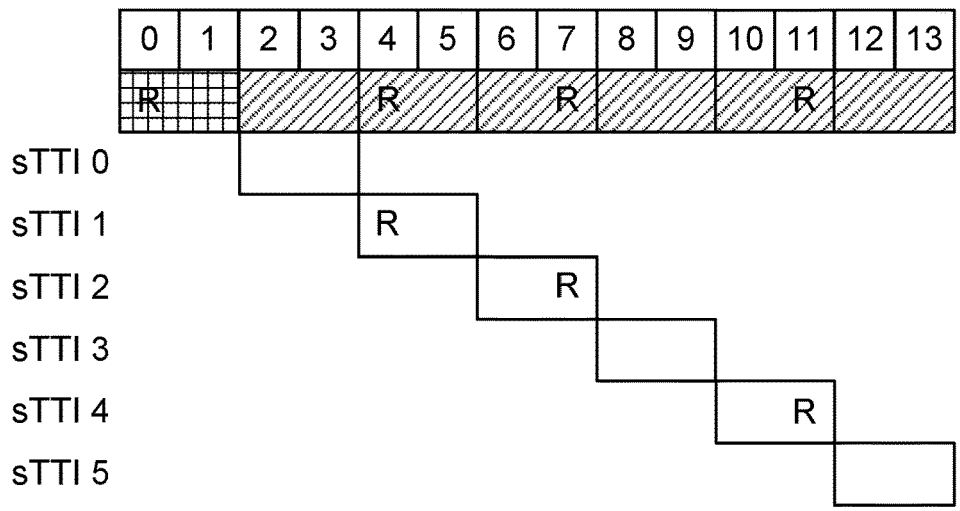
Figure 8C:
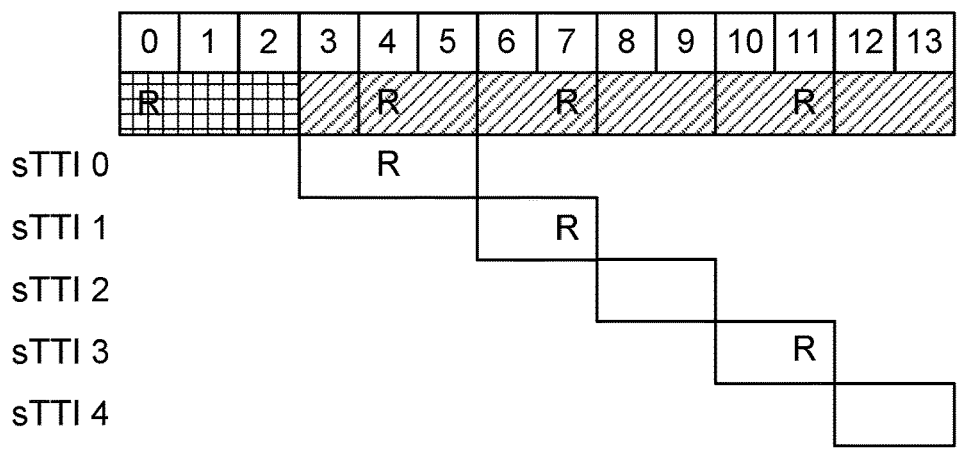

Examples of 2/3-symbol DL sTTI configurations in a subframe, with a sTTI boundary between symbol 7 and symbol 8, are presented in FIGS. 8a-8c.

For all the examples shown above, there are at least two OFDM symbols available for data transmission if the sTTI consists of the control region. If the frequency allocation for DL sTTI transmission is large, it can be possible to have only one symbol that is used for data transmission in the first TTI.

For all configurations shown above, the staring positions of sTTI transmissions are fixed, i.e., the sTTI starting positions do not move with the PDCCH ending position. This can be beneficial to simplify the design of search spaces for sPDCCH.

The configurations shown above are illustrated for Cell-specific Reference Signal (CRS) based DL sTTI transmissions. However, these configurations can also be applied for DMRS based DL sTTI transmissions, except that they will have different Reference Signal (RS) positions (in frequency and time domain) for each configuration.

FIG. 9 shows an example of a 2-symbol DL sTTI configuration in a subframe within a resource block pair for DMRS based DL sTTI transmissions, considering the case of two-symbol control region size. In this example, the DMRS are spanning two OFDM symbols such that DMRS for several antenna ports can chare the same resource elements by using Orthogonal Cover Codes (OCC). In an alternative DMRS design, only one OFDM symbol, within each sTTI is used for DMRS. Also, the CRS in FIG. 9 is based upon two antenna ports.

Figures 9A, 9B:
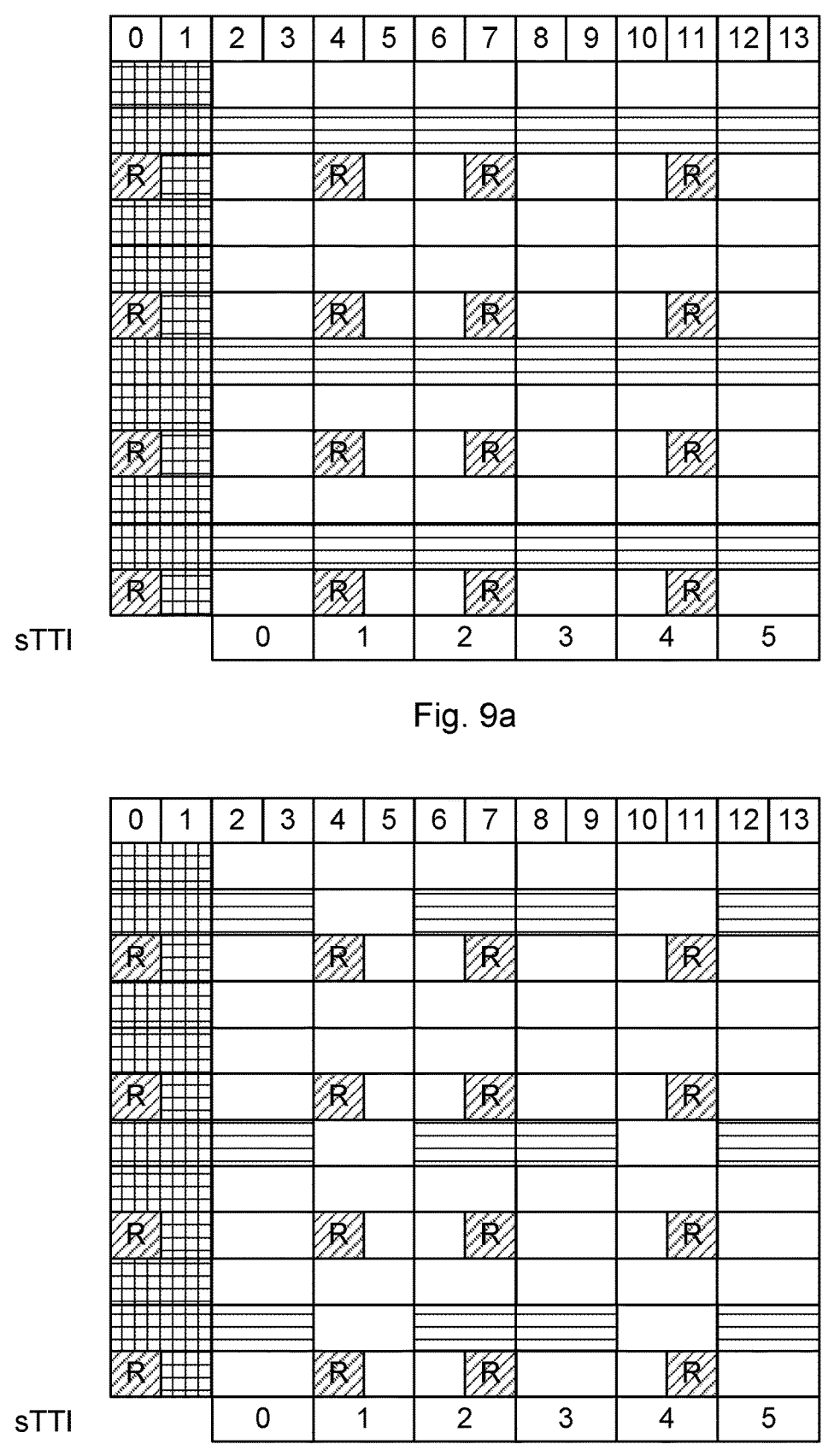
Figure 9C:
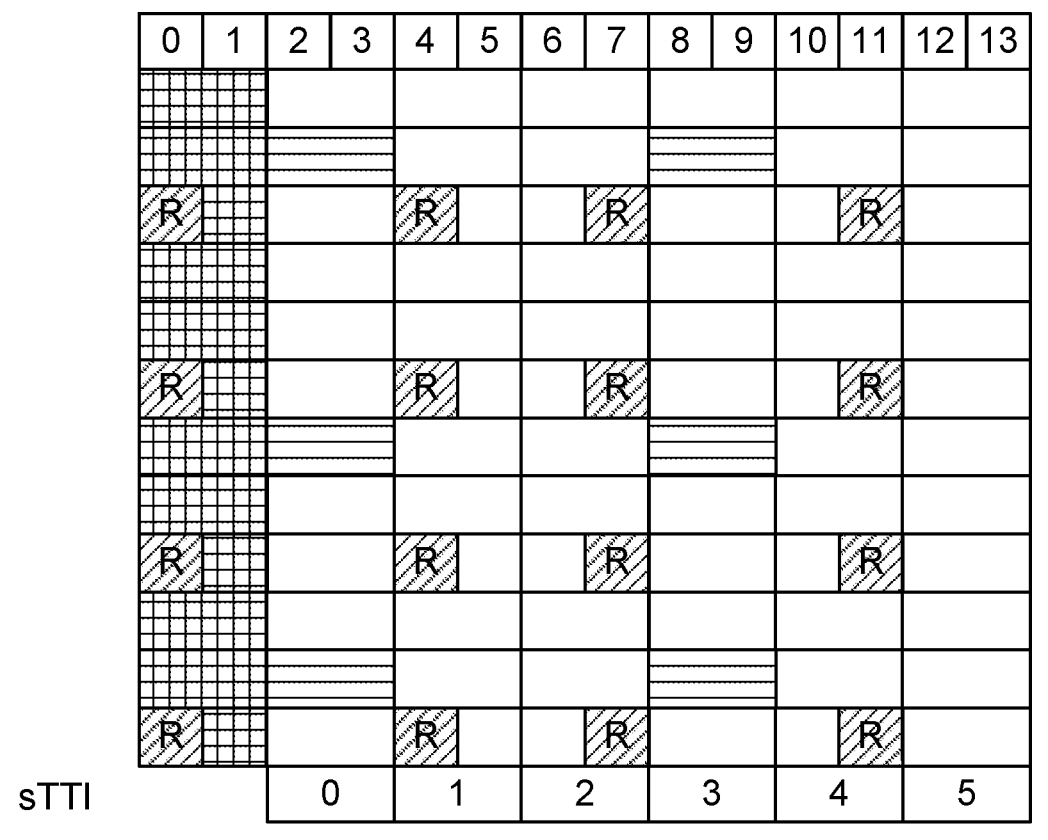

In FIG. 9, each row denotes a subcarrier, and each column corresponds to an OFDM symbol. The blue boxes are the symbols where the DMRS is inserted. In FIG. 9a, DMRS is transmitted at each sTTI. If sTTI 0 and sTTI 1 are assigned to the same UE and the coherence time of the channel is larger than 4 symbols, the DMRS symbols in sTTI 1 can be used for data transmission instead, as shown in FIG. 9b. If sTTI 0, sTTI 1 and sTTI 2 are assigned to the same UE and the coherence time of the channel is larger than 6 symbols, the DMRS symbols in sTTI 1 and sTTI 2 can be used for data transmission instead, as shown in FIG. 9c. This dynamic DMRS insertion can reduce the DMRS overhead. The example shown in FIGS. 9b and 9c explicitly specifies the sTTIs where dynamic DMRS insertion is applied. Another way of defining this configuration is to implicitly indicate the DMRS insertion sTTIs by the fast DCI, that is, if the UE is scheduled in the previous TTI and send a DMRS there, then, the UE shall not expect a DMRS in following sTTIs.

To maintain the opportunity of time-multiplexing of sTTIs with different lengths, dynamic DMRS insertion should only be allowed within the OFDM symbols that do not across the common bounder symbol.

FIG. 9 shows an example of 2-symbol DL sTTI configuration in a subframe for DMRS based transmission, DMRS transmitted in each sTTI, DMRS transmitted every two sTTIs, DMRS transmitted every three sTTIs.

This example shows a 2-symbol DL sTTI configuration in a subframe with 2-symbol control region, for the case of DMRS based DL sTTI transmissions. The same methodology can be applied to configure fixed DL sTTI patterns for DMRS based DL transmissions with other TTI lengths and/or with other sizes of the control region.

It is assumed that a set of DL sTTI configurations is predefined and known to both network node, eNodeB, and the sTTI UEs. The DL sTTI configuration is signalled by sending a slow DCI, which is transmitted on subframe basis in downlink, and it is common for a group of users. In another embodiment this configuration is done by higher layer signalling e.g. RRC.

As an example, six sTTI configurations are predefined for downlink short TTI transmissions. A sTTI configuration index field of three bits is introduced in a slow DCI or by RRC configurations, with the mapping of configurations given in Table 1.

TABLE 1

Example mapping table for sTTI configurations within a subframe.

| sTTI configuration index | Demodulation (as of TM) | Dynamic DMRS indication | sTTI configuration | Meaning |
| --- | --- | --- | --- | --- |
| 0 | CRS | — | FIG. 6 a-c, CRS | 6/7-symbol TTI, CRS based transmission |
|  | DMRS | — | FIG. 6 a-c, DMRS | 6/7-symbol TTI, DMRS based transmission |
| 1 | CRS | — | FIG. 7 a-c, CRS | 3/4-symbol TTI, CRS based transmission |
|  | DMRS | — | FIG. 7 a-c, DMRS | 3/4-symbol TTI, DMRS based transmission |
| 2 | CRS | — | FIG. 8 a-c, CRS | 2/3-symbol TTI, CRS based transmission |
|  | DMRS | — | FIG. 8 a-c, DMRS | 2/3-symbol TTI, DMRS based transmission |
| 3 | DMRS | 0 | FIG. 8 a-c, dynamic DMRS | 3/4-symbol TTI, allow dynamic DMRS |
|  | DMRS | 1 | FIG. 8 a-c, dynamic DMRS | 2/3-symbol TTI, allow dynamic DMRS |

Since the RS pattern in FIGS. 3-5 have a common sTTI boundary between symbol 6 and symbol 7, it is possible to extend Table 1 to include sTTI configurations where symbols 0-6 and symbols 7-13 follow different RS patterns. For instance, the symbols 0-6 could follow the pattern given in FIG. 3 while the symbols 7-13 of the subframe follows the pattern given in FIG. 5. To do so, the number of bits of the sTTI configuration needs to be increased to point to these additional sTTI configurations.

In this example, it is assumed that for each UE, the transmission mode configured for its DL sTTI transmissions is the same as the one configured for its legacy TTI transmissions, which is signalled by RRC. Therefore, this is no need to specify the transmission mode for DL sTTI transmissions in the slow DCI or by RRC configurations.

In an embodiment, if there is a need to configure a different transmission mode for a UE for DL sTTI transmissions, more bits can be added in the configuration index or a separate field can be added in the slow DCI, or signalled by RRC configurations to indicate the transmission mode.

Based on the decoded slow DCI within current subframe, the sTTI UEs are able to know the DL sTTI configurations for this subframe. Each DL short TTI transmission within a subframe is scheduled by a dedicated fast DCI, which is user specific and transmitted on symbol basis in downlink. The fast grant contains information about transport format, and precoding information in case of Multiple Input Multiple Output (MIMO) transmissions, etc.

By using the information of the decoded DL sTTI configuration in this subframe, the UE can also know where to search for sPDCCH, if the sPDCCH region is fixed in each DL sTTI, e.g. at the beginning of each DL sTTI.

In case the uplink sTTI patterns are also fixed for each subframe, the DL and UL sTTI patterns can be indicated together with a limited set of bits. The combination of DL and UL sTTI patterns can be optimized by taking the scheduling timing, HARQ timing, sPUCCH payload, and sPDCCH search space into account. In one embodiment, the common sTTI pattern in the slow DCI is valid in different sub-frames for downlink and uplink. Here, the slow DCI indicates the downlink sTTI pattern in the current sub-frame and the uplink sTTI pattern in a future sub-frame. This future sub-frame can be the sub-frame following after the sub-frame containing the slow DCI. In one embodiment, the same time offset as used for uplink frequency allocation in slow DCI is also used for uplink sTTI pattern offset. In another embodiment, the same time offset as used for uplink fast DCIs is also for uplink sTTI pattern offset.

In another embodiment the UE is configured by either the slow DCI or RRC for a specific sTTI length and not according to the specific table above both rather the length specifically, e.g. slot based, 2/3 or 4/3. The UE can assume based on the starting position of the sTTI band which of the highlight above configurations to assume. The starting positions can be given by PCFICH or signalled by RRC. The eNB would than operate according to the same sTTI lengths as well.

In an embodiment, for DMRS based DL sTTI configurations, dynamic DMRS insertion can be supported in several different ways. One approach is to support dynamic DMRS insertion by explicitly specifying where dynamic DMRS insertion is applied in a fixed sTTI configuration, e.g. FIGS. 9b and 9c. Another way is to explicitly indicate the DMRS insertion by the fast DCI, i.e. a bit field in the fast DCI format to indicate whether or not to transmit the DMRS in this sTTI. A third way is to implicitly indicate the DMRS insertion sTTIs by predefined scheduling assumptions, that is, if the UE is scheduled in the previous TTI and send a DMRS there, then, the UE shall not expect a DMRS in following sTTIs.

FIG. 1 is a schematic diagram illustrating a communications network 100 where embodiments presented herein can be applied. The communications network 100 comprises at least one network node 200. The functionality of the network node 200 and how it interacts with other entities, nodes, and devices in the communications network 100 will be further disclosed below.

The communications network 100 further comprises at least one radio access network node 140. The at least one radio access network node 140 is part of a radio access network 110 and operatively connected to a core network 120 which in turn is operatively connected to a service network 130. The at least one radio access network node 140 provides network access in the radio access network 110. A wireless device 300a, 300b served by the at least one radio access network node 140 is thereby enabled to access services and exchange data with the core network 120 and the service network 130.

Examples of wireless devices 300a, 300b include, but are not limited to, mobile stations, mobile phones, handsets, wireless local loop phones, user equipment (UE), smartphones, laptop computers, tablet computers, network equipped sensors, wireless modems, and Internet of Things devices. Examples of radio access network nodes 120 include, but are not limited to, radio base stations, base transceiver stations, NodeBs, evolved NodeBs, access points, and access nodes. The communications network 100 may comprise a plurality of radio access network nodes 120, each providing network access to a plurality of wireless devices 300a, 300b. The herein disclosed embodiments are not limited to any particular number of network nodes 200, radio access network nodes 120 or wireless devices 300a, 300b.

The wireless device 300a, 300b accesses services and exchanges data with the core network 120 and the service network 130 by transmitting data in packets to the core network 120 and the service network 130 and by receiving data in packets from the core network 120 and the service network 130 via the radio access network node 140.

Packet latency has above been identified as degrading network performance. One area to address when it comes to packet latency reductions is the reduction of transport time of data and control signalling, by addressing the length of a transmission time interval (TTI). In LTE, a TTI corresponds to one subframe of length 1 ms. One such 1-ms TTI is constructed by using 14 Orthogonal Frequency-Division Multiple Access (OFDM) or Single-Carrier Frequency-Division Multiple Access (SC-FDMA) symbols in the case of normal cyclic prefix and 12 OFDM or SC-FDMA symbols in the case of extended cyclic prefix.

The embodiments disclosed herein relate to mechanisms for providing configuration for downlink transmission to a wireless device 300a. The mechanisms may be implemented in communication systems compliant with the LTE standard or future generations of mobile communication standards, including the currently developed 3GPP New Radio technology. For this purposes, there is provided a network node 200, a method performed by the network node 200, a computer program product comprising code, for example in the form of a computer program, that when run on a processor of the network node 200, causes the network node 200 to perform the method.

The embodiments disclosed herein further relate to mechanisms for receiving configuration for downlink transmission from a network node 200. In order to obtain such mechanisms there is further provided a wireless device 300a, 300b, a method performed by the wireless device 300a, 300b, and a computer program product comprising code, for example in the form of a computer program, that when run on a processor of the wireless device 300a, 300b, causes the wireless device 300a, 300b to perform the method.

According to embodiments disclosed herein the TTIs are shortened in relation to legacy TTIs, i.e., shorter than a subframe of 1 ms. A short TTI (sTTI) can be assigned any duration in time and comprise resources on a number of OFDM or SC-FDMA symbols within a 1 ms subframe. As one example, the duration of a short subframe may be 0.5 ms, i.e., seven OFDM symbols or SC-FDMA symbols for the case with normal cyclic prefix. As another example, the duration of the short TTI may be 2 OFDM symbols. It may be considered that a sTTI has a duration between 1 and 7 symbols, preferably 2 symbols. A TTI pattern may be adapted accordingly to cover the sTTI duration.

Figure 2A:
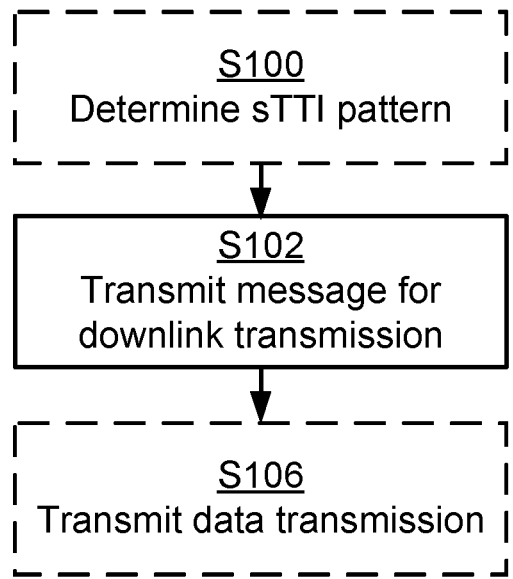
FIGS. 2A and 2B are flowcharts of methods according to embodiments presented herein.

With reference to FIG. 2A, a method for providing configuration for downlink transmission to a wireless device 300a is presented. The method is performed by a network node 200 and comprises transmitting S102 a DCI message comprising configuration for downlink transmission in a short Transmission Time Interval (sTTI). In particular, the DL transmission may occur in a TTI frequency band for sTTI and may be configured by the DCI message.

The configuration may comprise position of reference symbols and data symbols. The reference symbols may be DL DMRS or Cell-Specific Reference Signal (CRS). The configuration may comprise lengths of sTTIs.

The sTTI may have a fixed length for each subframe, in particular two or seven symbols. As another example, a subframe may have several sTTIs with fixed lengths. Each sTTI is shorter in time than a subframe and each sTTI comprises at least one OFDM or SC-FDMA symbol period.

The configuration may comprise lengths of sTTIs.

The sTTIs may have a fixed length for each subframe.

The method may further comprise transmitting S106 a data transmission to the wireless device on a short Physical Downlink Shared Channel (sPDSCH) according to the configuration of the DCI message.

The DCI may be a slow DCI. The slow DCI message may be sent to a group of wireless devices. The slow DCI message may be sent on a subframe basis.

The DCI may be a fast DCI and the fast DCI message is then sent to a specific wireless device. The fast DCI message may be sent on a symbol basis or a sTTI basis.

The sTTI may have a fixed pattern.

The sTTIs may have fixed starting symbols for DL sTTI data transmission within a subframe. The fixed starting symbol may be the first symbol within a subframe that DL sTTI data transmission can be performed. The fixed starting symbols may be selected in dependence on a control region of the DL subframe. The fixed starting symbol may be signaled by Physical Control Format Indicator Channel, PCFICH, or by Radio Resource Control, RRC.

The method may further comprise determining S100 a sTTI pattern to be used. The determining may be based on latency requirements.

The sTTIs may have a first fixed pattern and a second fixed pattern.

The sTTI patterns may consist of symbol lengths 3, 2, 2, 2, 2 and 3 in consecutive order, or may consist of symbol lengths 2, 3, 2, 2, 2 and 3 in consecutive order. The sTTI patterns may be one or more of (a) a sequence of one 3-symbol sTTI, four 2-symbol sTTIs and one 3-symbol sTTI, (b) a sequence of one 2-symbol sTTI, one 3-symbol sTTI, three 2-symbol sTTIs and one 3-symbol sTTI.

The sTTI data transmissions following a starting symbol index of 1 or 3 may have a first pattern and the sTTI data transmissions following a starting symbol index of 2 may have a second pattern. The sTTI patterns may consist of symbol lengths 3, 2, 2, 2, 2 and 3 in consecutive order following a starting symbol index of 1 or 3, and may consist of symbol lengths 2, 3, 2, 2, 2 and 3 in consecutive order following a starting symbol index of 2 have a second pattern. The same pattern may be used with both 1 or 3 symbols in the PDCCH region. The first TTI is then of length 3. If the PDCCH region is 1 symbol, then the two last symbols of the three are used for data; if the PDCCH region is 3 symbols, then this TTI is not used for data.

The method may further comprise switching between different patterns between subframes.

A method for configuration of downlink transmission from a network node 200 is presented. The method is performed by a wireless device 300a and comprises receiving S202 a DCI message comprising configuration for downlink transmission in a sTTI. The DCI message may be received in a TTI frequency band for sTTI.

The configuration may comprise position of reference symbols and data symbols. The reference symbols may be DL DMRS.

The configuration may comprises lengths of sTTIs.

The sTTIs may have a fixed length for each subframe. The sTTI length may be two or seven symbols.

The method may further comprise receiving S204 a data transmission from the network node on a short Physical Downlink Shared Channel (sPDSCH) according to the configuration of the DCI message.

The DCI message may be a slow DCI message and the slow DCI may be sent on subframe basis.

The DCI message may be a fast DCI message and the fast DCI message may be sent to a specific wireless device. The fast DCI message may be sent on symbol or sTTI basis.

The sTTIs may have a fixed pattern for each subframe.

The sTTIs may have fixed starting symbols within a DL subframe for data transmission. The fixed starting symbol may be the first symbol within a subframe that DL sTTI data transmission can be performed. The fixed starting symbols may be selected in dependence on a control region of the DL subframe. The fixed starting symbol may be signaled by Physical Control Format Indicator Channel (PCFICH), or by a Radio Resource Control (RRC) communication.

The method may further comprise determining S203 a sTTI pattern to be used. The determining may be based on starting symbol index within a DL subframe for data transmission.

The sTTIs may have a first fixed pattern and a second fixed pattern.

The sTTI patterns may consist of symbol lengths 3, 2, 2, 2, 2 and 3 in consecutive order, or may consist of symbol lengths 2, 3, 2, 2, 2 and 3 in consecutive order.

The sTTI data transmissions following a starting symbol index of 1 or 3 may have a first pattern and the sTTI data transmissions following a starting symbol index of 2 may have a second pattern. The sTTI patterns may consist of symbol lengths 3, 2, 2, 2, 2 and 3 in consecutive order following a starting symbol index of 1 or 3, and may consist of symbol lengths 2, 3, 2, 2, 2 and 3 in consecutive order following a starting symbol index of 2 have a second pattern.

The method may further comprise switching between different patterns between subframes.

A method for providing configuration for downlink transmission to a wireless device 300a is presented. The method is performed by a network node 200 and comprises transmitting S102 a RRC message comprising configuration for DL transmission in a sTTI.

A method for configuration of downlink transmission from a network node 200 is presented. The method is performed by a wireless device 300a and comprises receiving S202 a RRC message comprising configuration for downlink transmission in a sTTI.

A network node for providing configuration for downlink transmission to a wireless device 300a is presented. The network node 200 comprises a processor 210 and a computer program product 212, 213. The computer program produce stores instructions that, when executed by the processor, causes the network node to transmit S102 a DCI message comprising configuration for downlink transmission in a sTTI.

A wireless device for configuration of downlink transmission from a network node 200 is presented. The wireless device 300a comprises a processor 310 and a computer program product 312, 313. The computer program product stores instructions that, when executed by the processor, causes the wireless device to receive S202 a DCI message comprising configuration for downlink transmission in a sTTI.

A network node for providing configuration for downlink transmission to a wireless device 300a is presented. The network node 200 comprises a processor 210 and a computer program product 212, 213. The computer program product stores instructions that, when executed by the processor, causes the network node to transmit S102 a RRC message comprising configuration for downlink transmission in a sTTI.

A wireless device for configuration of downlink transmission from a network node 200 is presented. The wireless device 300a comprises a processor 310 and a computer program product 312, 313. The computer program product stores instructions that, when executed by the processor, causes the wireless device to receive S202 a RRC message comprising configuration for downlink transmission in a sTTI.

A network node for providing configuration for downlink transmission to a wireless device 300a is presented. The network node 200 comprises a communication manager 250 for transmitting S102 a DCI message comprising configuration for downlink transmission in a sTTI.

A wireless device for configuration of downlink transmission from a network node 200 is presented. The wireless device 300a comprises a communication manager 350 for receiving S202 a DCI message comprising configuration for downlink transmission in a sTTI.

A network node for providing configuration for downlink transmission to a wireless device 300a is presented. The network node 200 comprises a communication manager 250 for transmitting S102 a RRC message comprising configuration for downlink transmission in a sTTI.

A wireless device for configuration of downlink transmission from a network node 200 is presented. The wireless device 300a comprises a communication manager 350 for receiving S202 a RRC message comprising configuration for downlink transmission in a sTTI.

A computer program 214, 215 for providing configuration for downlink transmission to a wireless device 300a is presented. The computer program comprising computer program code which, when run on a network node 200, causes the network node 200 to transmit S102 a DCI message comprising configuration for downlink transmission in a sTTI.

A computer program 314, 315 for configuration of downlink transmission from a network node 200 is presented. The computer program comprising computer program code which, when run on a wireless terminal 300, causes the wireless terminal 300 to receive S202 a DCI message comprising configuration for downlink transmission in a sTTI.

A computer program 214, 215 for providing configuration for downlink transmission to a wireless device 300a is presented. The computer program comprising computer program code which, when run on a network node 200, causes the network node 200 to transmit S102 a RRC message comprising configuration for downlink transmission in a sTTI.

A computer program 314, 315 for configuration of downlink transmission from a network node 200 is presented. The computer program comprising computer program code which, when run on a wireless terminal 300, causes the wireless terminal 300 to receive S202 a RRC message comprising configuration for downlink transmission in a sTTI.

A computer program product 212, 213 or 312, 313 is presented. The computer program product comprises a computer program 214, 215 or 314, 315 described above and a computer readable storage means on which the computer program 264, 265 or 364, 365 is stored.

Figure 11:
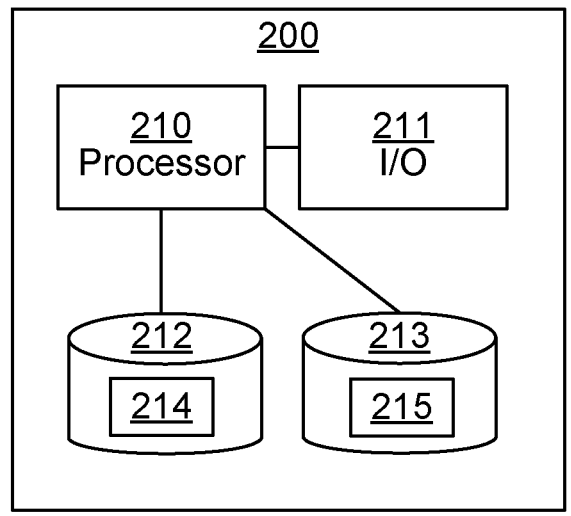
FIG. 11 is a schematic diagram showing some components of a network node.

FIG. 11 is a schematic diagram showing some components of the network node 200. A processor 210 may be provided using any combination of one or more of a suitable central processing unit (CPU), multiprocessor, microcontroller, digital signal processor (DSP), application specific integrated circuit (ASIC) etc., capable of executing software instructions of a computer program 214 stored in a memory. The memory can thus be considered to be or form part of the computer program product 212. The processor 210 may be configured to execute methods described herein with reference to FIG. 2A.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 213 in the form of a data memory may also be provided, e.g. for reading and/or storing data during execution of software instructions in the processor 210. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 215, to improve functionality for the network node 200.

The network node 200 may further comprise an input/output, I/O, interface 211 including e.g. a user interface. The network node may further comprise a receiver configured to receive signalling from other nodes, and a transmitter configured to transmit signalling to other nodes (not illustrated). Other components of the network node are omitted in order not to obscure the concepts presented herein.

Figure 13:
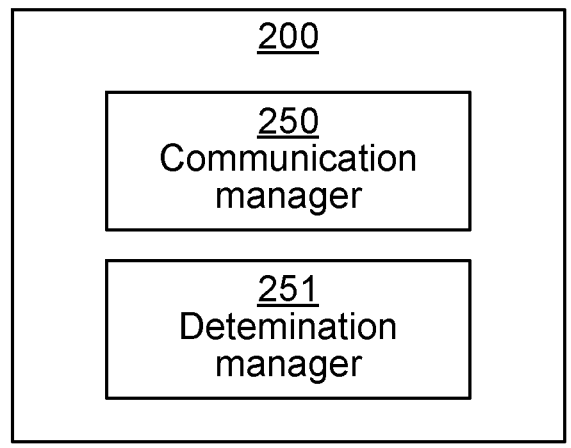
FIG. 13 is a schematic diagram showing functional modules of a network node.

FIG. 13 is a schematic diagram showing functional blocks of the network node 200. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 2A, comprising a communication manager unit 250 and a determination manager unit 251. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manger 250 is for providing configuration for downlink transmission to the wireless device 300a. This module corresponds to the transmit step S102 and the transmit step S106 of FIG. 2A. This module can e.g. be implemented by the processor 210 of FIG. 11, when running the computer program.

The determination manager 251 is adapted to provide configuration for DL transmission to the wireless device 300a. This module corresponds to the determine step S100 (FIG. 2A) and can be implemented by the processor 210 of FIG. 11 when running the computer program.

Figure 2B:
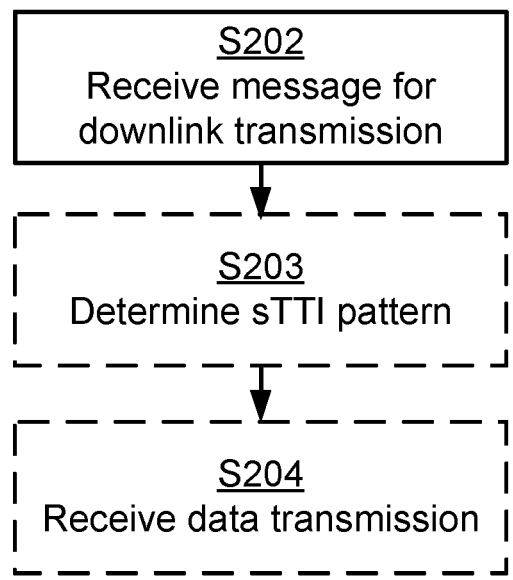
Figure 10:
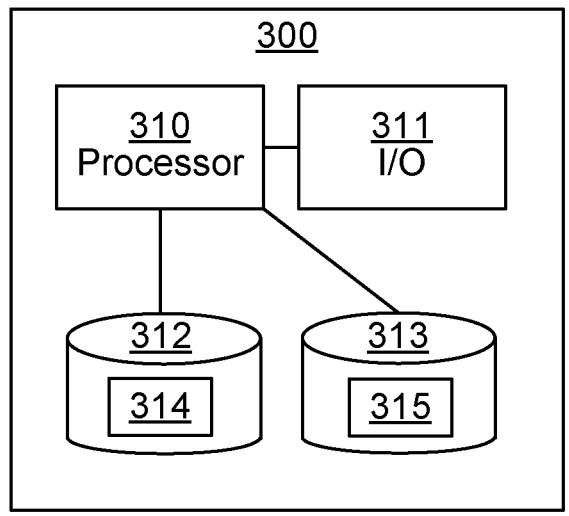
FIG. 10 is a schematic diagram showing some components of a wireless device.

FIG. 10 is a schematic diagram showing some components of the wireless device 300. A processor 310 may be provided using any combination of one or more of a suitable CPU, multiprocessor, microcontroller, DSP, ASIC etc., capable of executing software instructions of a computer program 314 stored in a memory. The memory can thus be considered to be or form part of the computer program product 312. The processor 310 may be configured to execute methods described herein with reference to FIG. 2B.

The memory may be any combination of read and write memory (RAM) and read-only memory (ROM). The memory may also comprise persistent storage, which, for example, can be any single one or combination of magnetic memory, optical memory, solid state memory or even remotely mounted memory.

A second computer program product 313 in the form of a data memory may also be provided, e.g. for reading and/or storing data during execution of software instructions in the processor 310. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 315, to improve functionality for the wireless device 300.

The wireless device may further comprise an input/output, I/O, interface 311 including e.g. a user interface. The wireless device may further comprise a receiver configured to receive signalling from other nodes, and a transmitter configured to transmit signalling to other nodes (not illustrated). Other components of the wireless device are omitted in order not to obscure the concepts presented herein.

Figure 12:
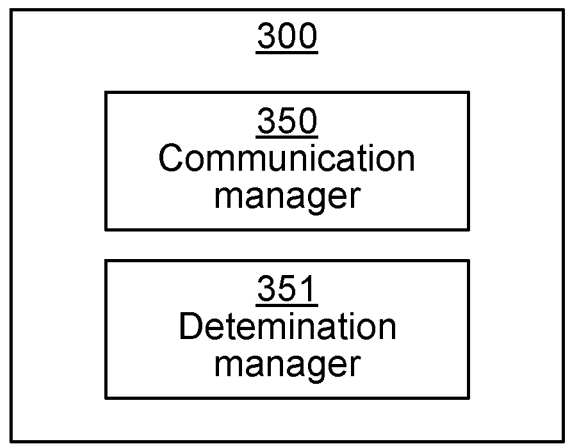
FIG. 12 is a schematic diagram showing functional modules of a wireless device.

FIG. 12 is a schematic diagram showing functional blocks of the wireless device 300. The modules may be implemented as only software instructions such as a computer program executing in the cache server or only hardware, such as application-specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 2B, comprising a communication manager unit 350 and a determination manager unit 351. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manager 350 is for configuration of downlink transmission from a network node 200. This module corresponds to the transmit step S202 and the transmit step S204 of FIG. 2B. This module can e.g. be implemented by the processor 310 of FIG. 10, when running the computer program.

The determination manager 351 is for configuration of downlink transmission from a network node 200. This module corresponds to the determine step S203 of FIG. 2B. This module can e.g. be implemented by the processor 310 of FIG. 10, when running the computer program.

Figure 14:
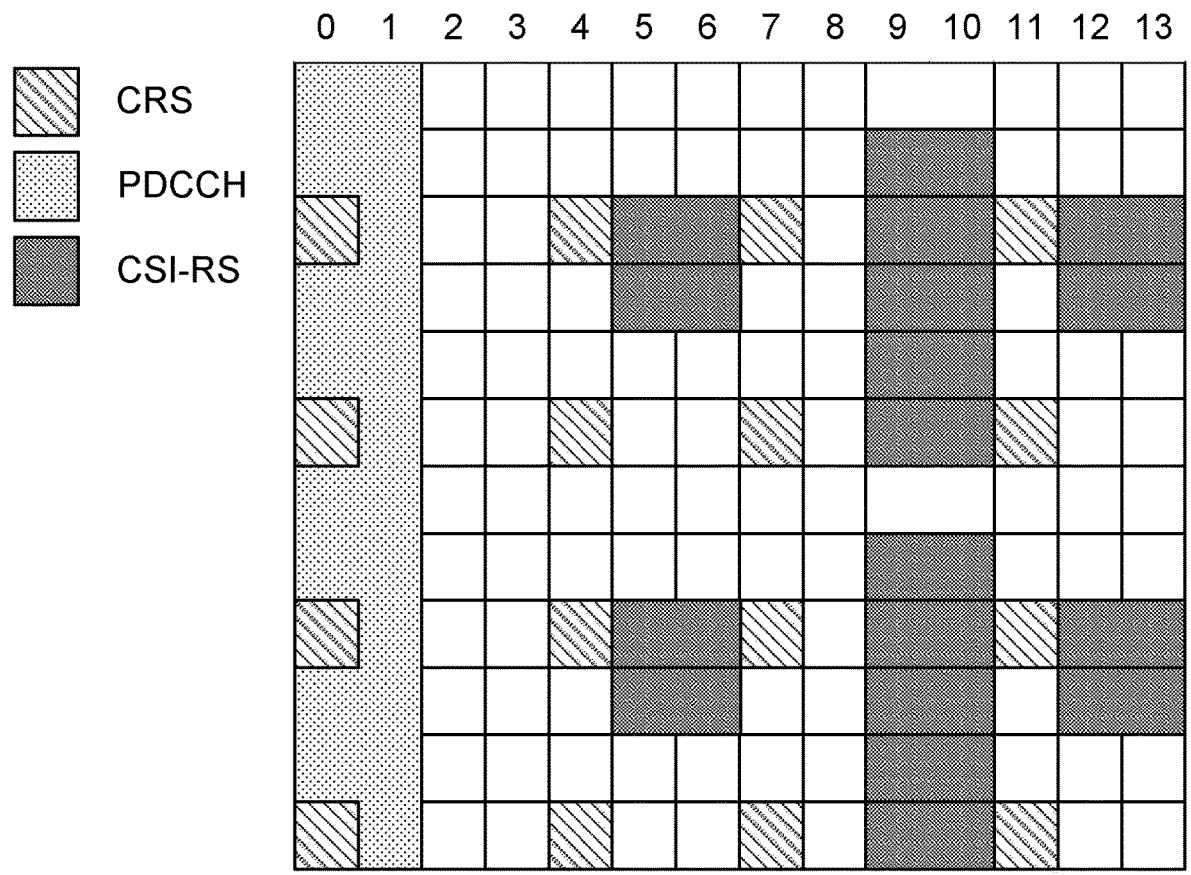

In the description of the subsequent embodiments, reference will be made to Channel State Information Reference Signal (CSI-RS), which is an example of reference signalling. The CSI-RS is a cell specific signal spanning two consecutive symbols in downlink, see FIG. 14. There are 20 different CSI-RS positions possible in a subframe. A cell may for example be configured with one, two, four, or eight CSI-RS according to predefined patterns. In the case of one CSI-RS, the pattern for two CSI-RS may be used.

CSI-RS is used by the network (e.g. in cooperation with a terminal performing a CSI procedure) to acquire channel state information and to estimate the interference. CSI-RS can be of zero power (muted), which makes it possible for a UE to measure on another cell than its serving cell, and also to measure on configured CSI-IM (Interference Measurement) resources, defined as a zero-power CSI-RS resource intended for interference measurement.

DL patterns for sTTI operations may not be not confined to the slot, such that legacy LTE CSI-RS pattern may end up in multiple sTTI. If a CSI-IM is performed in a neighboring cell and the two symbols correspond to two different sTTI transmissions with different characteristics, the measurement quality may be impacted.

Herein, however, are presented DL sTTI patterns that contain whole CSI-RS, which may be aligned at a symbol index or border, allowing a broad range of, or a change of TTI lengths. The TTI patterns may be defined such that they do not cross a slot border within a subframe, and/or may be in one version, limited to the first slot of a subframe (slot 0). The patterns for TTI may be multiplexed in time and/or over several channels, as described herein. Alternatively or additionally, one or more patterns may be time-aligned at a specific symbol or a symbol border, which may be represented by the associated symbol index. For example, the symbol aligned to may be the first symbol of the next slot relative to the leading (in time) border of this symbol, which may be considered to correspond to the trailing (in time) border of the last symbol of the current slot.

The proposed solution supports in particular downlink sTTI transmissions while maintaining the quality of CSI-RS measurements which are an important part of channel and interference estimation.

By confining the sTTIs within a slot, the sTTI length can be changed (switching between patterns) at the slot border and/or between subframes. There also exists a frequency-hopping resource allocation scheme (resource allocation of type 2 with virtual resource blocks) where frequency allocation can change between the slots.

New patterns for sTTI transmission in DL may be defined based on one or more of the following conditions:
The sTTIs are defined as part of the PDSCH in the DL subframe; and/or
The sTTIs are aligned at a symbol with a given index (e.g. 7), in particular a border thereof, for example the border leading in time (e.g. they do not cross the slot border=alignment at symbol index 7); and/or
The CSI-RS/IM pairs are contained in one sTTI; and/or
The sTTIs should be of the designated length (e.g. 2 or 7 symbols) when possible.

Figure 15:

The above conditions taken together lead to patterns shown in FIG. 15.

Generally, a TTI pattern (sTTI pattern) may be represented by and/or associated to a TTI duration or length.

As seen in FIG. 15, for the 2 symbol TTI case, some TTIs are forced or extended to a length of 3 symbols. This can be done in several ways, and two options are shown in the FIG. 15.

Figure 16:

As yet another option, FIG. 16 shows two cases where the split is changed for 1os (OFDM symbol length) PDCCH. This is done to keep the number of TTIs the same (always five), independent on number of used PDCCH symbols.

As an embodiment, the position of the longer TTIs in the 2 symbol case is chosen so that they contain multiple UL DCI as required by the UL sTTI scheduling. This may happen in the case of 6 or 8 UL sTTI per subframe and only 5 DL sTTI per subframe, thus requiring more than one UL sTTI to be scheduled from one DL sTTI. The flexibility in the DL pattern can then be used to place the longer TTIs where the extra UL DCI messages are required. This depends on the UL timing which is not decided yet.

Figure 17:
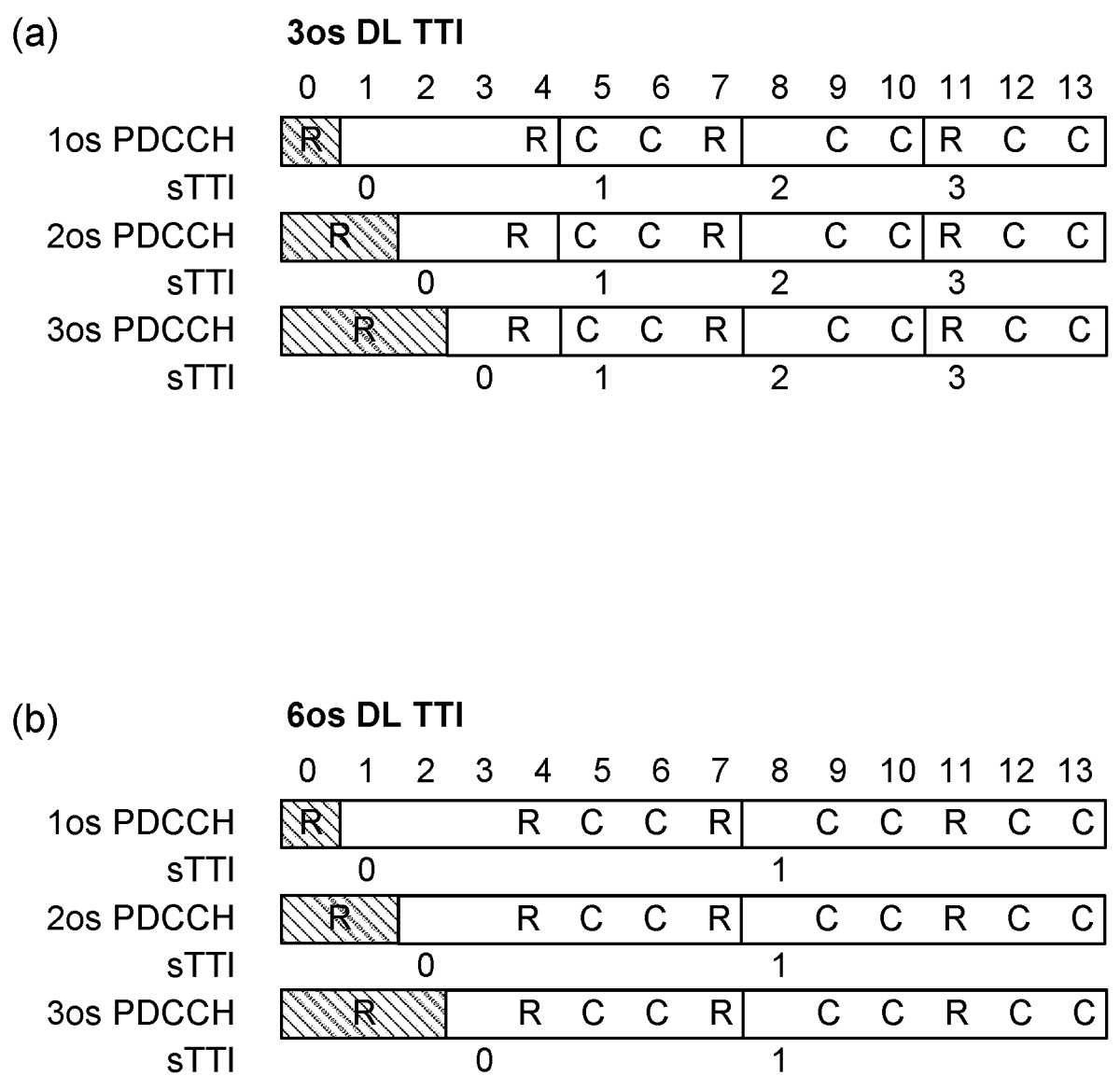

Another way to allow for time-multiplexing of sTTIs with different lengths is to have a sTTI ending at the same OFDM symbol for all different configurations. This symbol does not necessarily need to be the last symbol of the first slot of a subframe. This would not allow the frequency-hopping allocation, but may have the advantage of more equal TTI lengths. An example of this is shown in FIG. 17 with 3 symbol and 6 symbol TTI length.

Generally, to each subframe or slot, there may be associated one or more TTI patterns and/or TTI lengths, such that one or more TTI patterns may be included in one slot or a subframe. A TTI pattern may pertain to downlink and/or uplink transmissions. In a subframe, there may be arranged or allocated TTI patterns comprising or scheduling downlink transmissions, uplink transmission, or both. To a TTI pattern, there may be associated, or be assigned (e.g., such that the TTI patterns comprises), a reference signalling pattern (RS pattern), and/or a control channel pattern. A RS pattern may for example comprise a CSI-RS pattern and/or CRS pattern, for example in or for DL, and/or a SRS pattern, e.g. in or for uplink. A control channel pattern may pertain to one or more physical control channels, e.g., for example PDCCH and/or PUCCH.

A pattern, like TTI pattern, or a reference signalling pattern (of a TTI pattern) may define the resource distribution, in particular in time/frequency and/or power, used for TTI pattern, or the reference signalling respectively its transmission. A pattern may be defined in regards to, and/or comprise or indicate, a density (of symbols or signalling) in time and/or frequency, e.g. in terms of how may resource elements (Res) and/or symbols are transmitted in a given time interval like a TTI or subframe or slot, and/or on a carrier or frequency range, in particular pertaining to the number of subcarrier used for RS transmission. Generally, to different beamforming states and/or different beam reception states, there may be associated different patterns.

DL generally refers to transmission of data to a node/into a direction further away from network core (physically and/or logically), in particular from a base station or eNodeB to a D2D enabled node or UE, and often uses specified spectrum/bandwidth different from UL (e.g. LTE).

UL generally refers to transmission of data to a node/into a direction closer to a network core (physically and/or logically), in particular from a D2D enabled node or UE to a base station or eNodeB. In the context of D2D, it may refer to the spectrum/bandwidth utilized for transmitting in D2D, which may be the same used for UL communication to a eNB in cellular communication. In some D2D variants, transmission by all devices involved in D2D communication may in some variants generally be in UL spectrum/bandwidth/carrier/frequency.

FIG. 10 schematically shows a wireless device or terminal 300, which may be implemented in this example as a user equipment. Terminal 300 may comprises control circuitry, which may comprise a controller connected to a memory. Any module of the terminal, e.g. receiving module and/or transmitting module and/or control or processing module, may be implemented in and/or executable by, the control circuitry, in particular as module in the controller. Terminal 300 may also comprise radio circuitry providing receiving and transmitting or transceiving functionality, the radio circuitry connected or connectable to the control circuitry. An antenna circuitry of the terminal 300 may be connected or connectable to the radio circuitry to collect or send and/or amplify signals. Radio circuitry and the control circuitry controlling it may be configured for cellular communication with a network on a first cell/carrier and a second cell/carrier, in particular utilizing E-UTRAN/LTE resources as described herein. The terminal 300 may be adapted to carry out any of the methods for operating a terminal disclosed herein; in particular, it may comprise corresponding circuitry, e.g. control circuitry.

FIG. 11 schematically shows a network node or base station 200, which in particular may be an eNodeB. Network node 200 may further comprise control circuitry, which may comprise a controller connected to a memory. Any module, e.g. receiving module and/or transmitting module and/or control or processing module, of the network node may be implemented in and/or executable by the control circuitry. The control circuitry may be connected to control radio circuitry of the network node 200, which provides receiver and transmitter and/or transceiver functionality. An antenna circuitry may be connected or connectable to radio circuitry for signal reception or transmittance and/or amplification. The network node 200 may be adapted to carry out any of the methods for operating a network node disclosed herein; in particular, it may comprise corresponding circuitry, e.g. control circuitry. The antenna circuitry may be connected to and/or comprise an antenna array.

Implementation example

It will now be described how different TTIs can be supported in LTE and what the implications on HARQ and grant timing are.

1. DL Subframes

For the DL, layouts of the sTTI in a subframe will be presented for two different (sTTI) lengths: 2 OFDM symbols (os) and 7os. To simplify the definition of UL grant timing and DL HARQ timing it is proposed that the DL TTIs have fixed starting positions and that the length of the first DL TTI, and in some cases the number of DL TTIs, varies depending on the number of symbols used for PDCCH, see FIG. 18. Since the longest PDCCH length of 4 OFDM symbols is intended for narrowband operation, it is not proposed to use it for sTTI operation, since the control overhead may become too large.

When defining the positions of a 2-symbol DL sTTI within the subframe, the CSI-RS pattern should be considered so that a CSI-RS pair in time domain does not overlap two consecutive DL TTIs but is contained in a single sTTI. This enables to combine the sTTI feature with CSI-RS based transmission modes, especially to obtain accurate interference measurement with CSI-IM.

FIG. 18 shows TTIs in DL subframe for different TTI lengths and PDCCH lengths. R and C denote a OFDM symbol with CRS and potential CSI-RS, respectively.

Proposal 1: Aim at that a DL TTI length corresponds to fixed starting symbols of TTIs in PDSCH.

Proposal 2: PDCCH length of 4 should not be supported for sTTI operation.

Proposal 3: sTTI position is designed so that it does not partly overlap with potential CSI-RS resources The timing for transmitting DL HARQ in UL needs to be well defined and should not be indicated to the UE in the DL assignment. To keep the payload of each sPUCCH low the DL HARQ should be distributed over the UL subframe, which may depend on the length of sPUCCH. Also multiplexing capabilities should be considered. A fixed mapping from DL TTI to sPUCCH for a certain DL TTI and sPUCCH combination is proposed.

Proposal 4: The DL HARQ timing is fixed for a combination of DL and UL TTI for sPUCCH.

2. UL Subframes 2.1. sPUSCH

Figure 19:
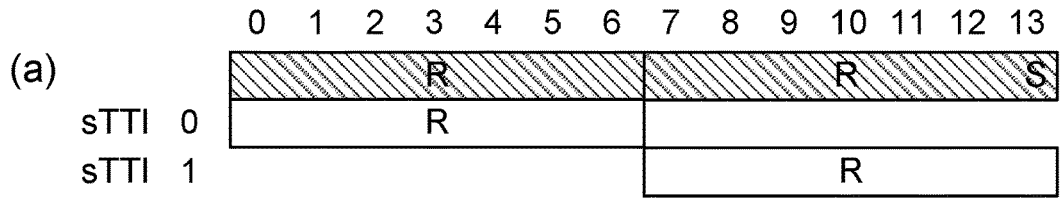
Figure 19:
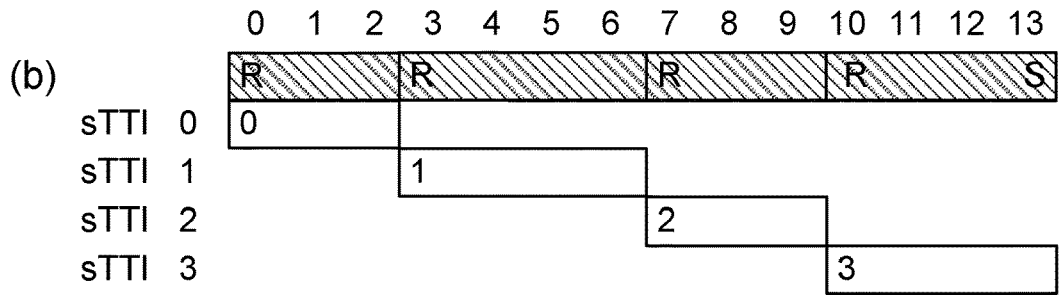
Figure 19:
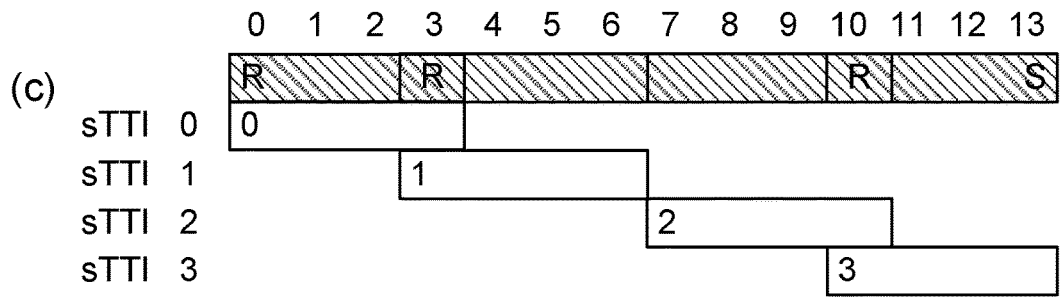
Figure 19:
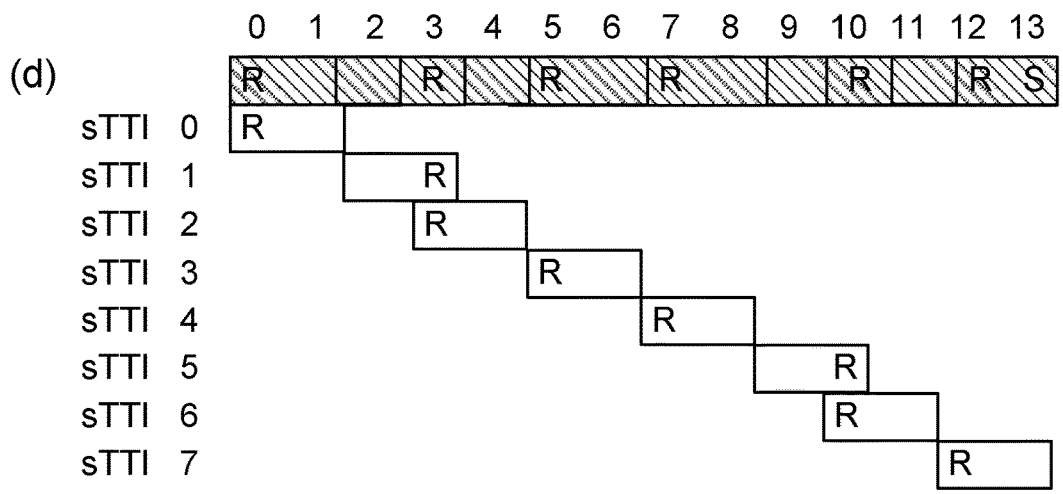
Figure 19:
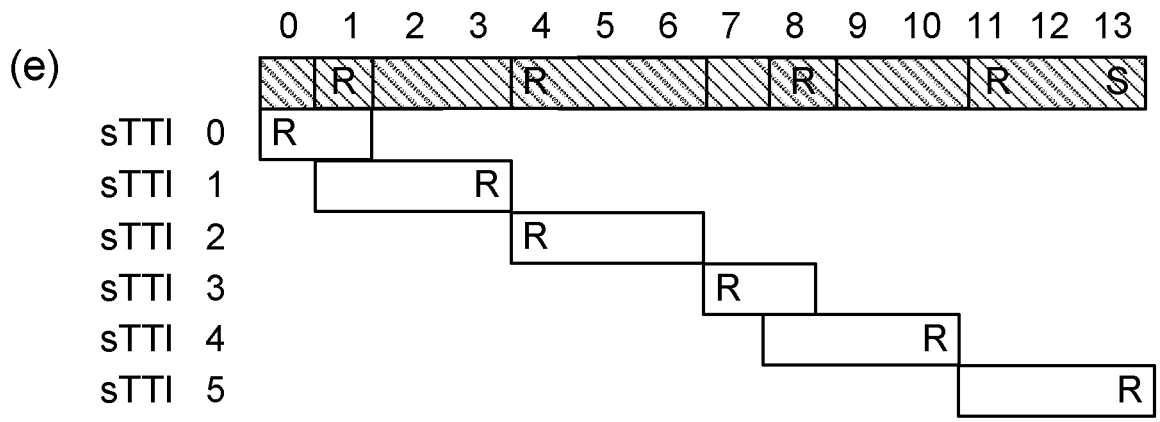
Figure 19:
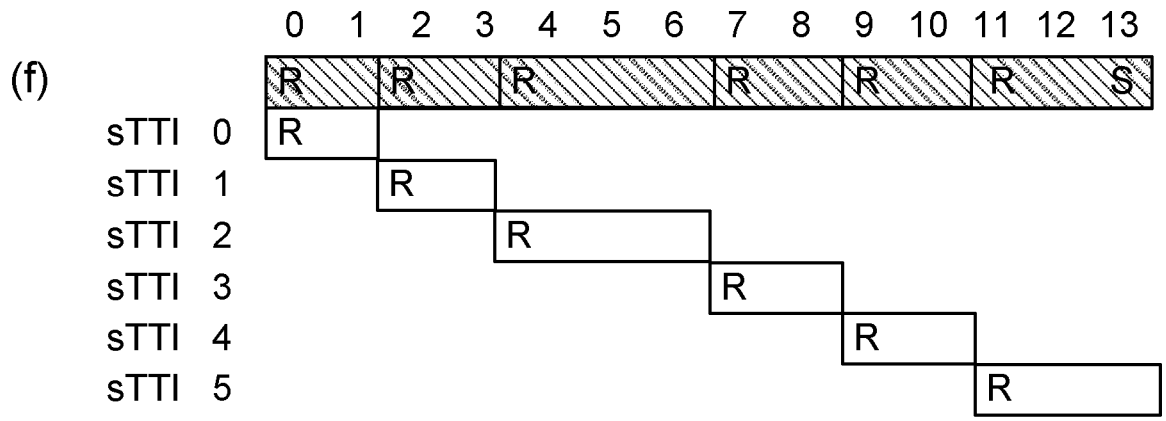
Figure 19:
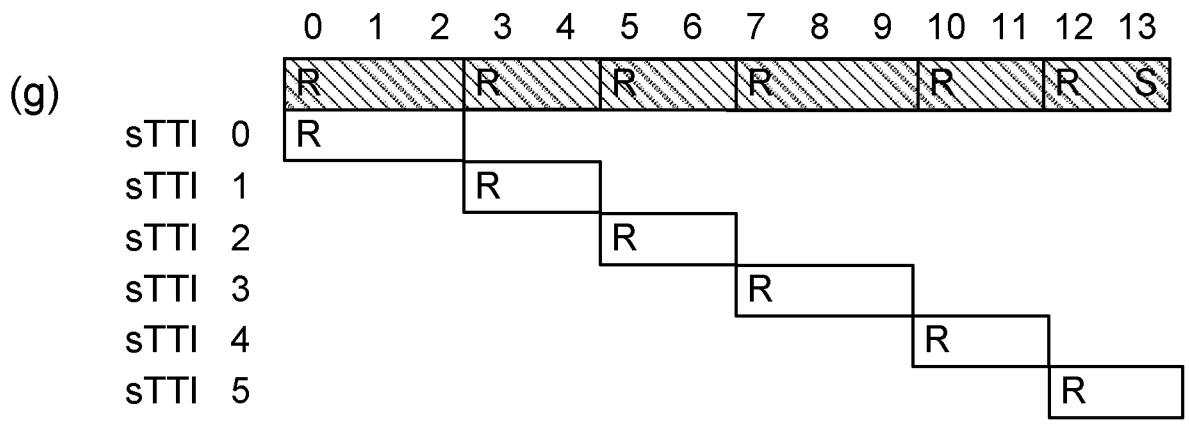

For sPUSCH a certain TTI length may correspond to different TTI configurations depending on if the DMRS are shared or not. In FIG. 19, examples for TTI lengths of 2, 4, and 7os with and without SRS in the last symbol are given. For a given configuration the TTIs have fixed starting positions, and are placed such that the TTIs do not cross the slot-border. This way, slot-based frequency hopping is possible.

FIG. 19 shows TTIs for sPUSCH in UL subframe for one realization of the different options of TTI lengths, where R denotes reference symbol and S SRS position (if scheduled).

Different UL TTI configurations can be defined for an UL TTI length.

Proposal 5: Aim that an UL TTI configuration corresponds to fixed starting symbol of TTIs in PUSCH.

Proposal 6: Uplink sTTI transmission is not mapped across slot-boundary.

Proposal 7: It is recommended to support 2/3 symbols sPUSCH for lowest latency, and 4 and 7 symbols sPUSCH for reduced latency with higher TBS.

The UL grant for the UL sTTI should be transmitted in the sPDCCH inside the DL sTTI. The number of TTIs in DL can be fewer in some configurations. For example, only 5 DL TTIs are included within one sub-frame, see FIG. 18, for an sPDCCH of 3 symbols and DL TTIs of 2 symbols. According to FIG. 15, up to 8 TTIs can be contained in an UL sub-frame. Thus a possibility to send at least 2 UL grants within one DL sTTI is needed. Each UL grant should then specify which of two possible UL TTIs that is granted, if not implicit from location.

Proposal 8: The time from UL grant to sPUSCH transmission is based on a combination of sPDCCH timing and configuration in UL grant.

2.2. sPUCCH

The pattern of sPUCCH TTI may differ from that of sPUSCH. For the shortest DL TTI of 2 symbols, the sPUCCH should be equally long as the DL TTI to provide the shortest delay and to avoid multiplexing or bundling HARQ. This also allows for a simple 1-1 mapping between a DL TTI and the sPUCCH in which HARQ feedback is transmitted. More than 6 sPUCCH per subframe is not required since this corresponds to the maximum number of DL sTTI in a subframe. The sPUCCH should, if possible, be aligned to the sPUSCH of FIG. 2. This is to avoid overlapping transmissions from a UE. Different patterns may be used if the subframe contains SRS.

Figure 20:
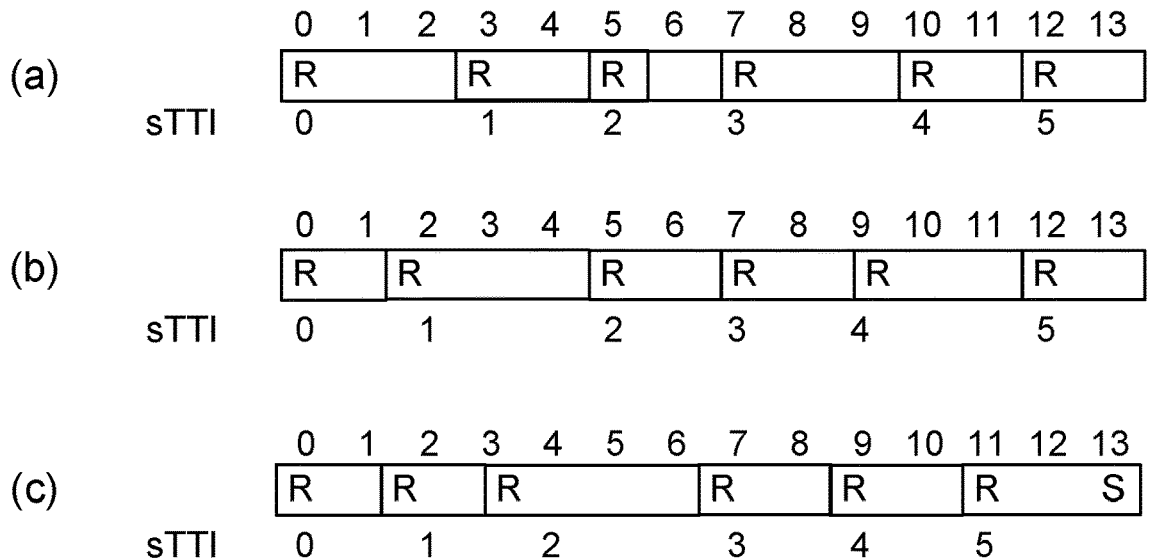
Figure 20:
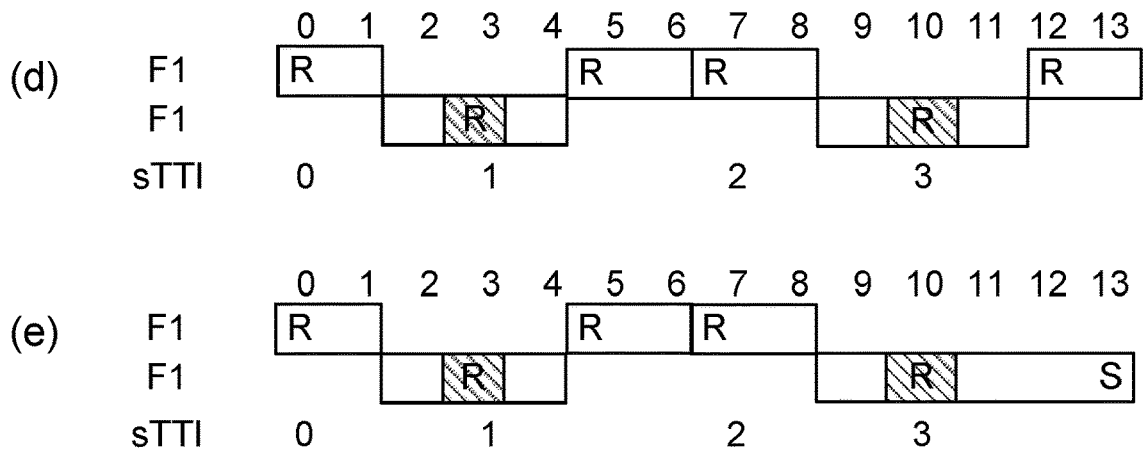
Figure 20:
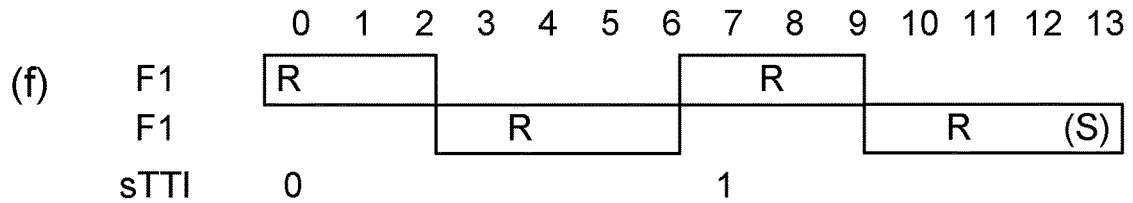

FIG. 20 shows TTIs for sPUCCH of different length. For 4os and 7os TTI frequency hopping between F1 and F2 is possible. S denotes symbol with SRS, and orange denotes symbol shared between users.

Two sPUCCH concepts may refer to a short and a long sPUCCH. In addition to the shorter sPUCCH solution described above, a longer sPUCCH may be provided for improved coverage. For TDD operation, and for carrier aggregation (CA) support, also higher payloads may be provided. A 7 symbol sPUCCH based on PUCCH Format PF3 or PF4 would fulfill the requirements on improved coverage and increased payload, and also provide sufficiently low latency.

Also a 4-symbol sPUCCH should be specified if a 4-symbol sPUSCH is specified, since it is much easier if the TTI of PUSCH and PUCCH is the same, as discussed below.

Proposal 9: Define sPUCCH of 2/3 symbols TTI, to support SR and HARQ-ACK, and sPUCCH of 4 and 7 symbols for improved coverage and increased payload.

3. TTI Length Combinations

It should be possible to combine the TTI lengths in DL and UL as described above. For overhead and payload reasons it may make sense to use a longer TTI for UL data if latency needs are less strict, and for coverage reasons a longer sPUCCH may be important. However, it is reasonable to limit the combinations so that scheduling and feedback do not become overly complex.

Proposal 10: Specify the allowed combinations of a DL TTI length and the allowed UL TTI length.

If the UL TTI is shorter than the DL TTI, multiple UL grants may be needed in one DL TTI. For coverage reasons the sPUCCH TTI should only be as short as the DL TTI, or longer. Thus, it is proposed that the UL TTI lengths (sPUSCH and sPUCCH) are the same or longer than the DL TTI.

Proposal 11: UL TTI length for sPUSCH and sPUCCH can be equal or longer than DL TTI length.

The sPUCCH TTI length could in principle be set independently of the PUSCH TTI length, since the period of sPUCCH is more connected to DL TTI, as payload and timing should be properly set. However, to facilitate the UCI mapping on sPUSCH and ensure sufficient UCI performance on sPUSCH, the TTI length of sPUSCH should be the same or longer than the one of sPUCCH. In general, if a 7-symbol sPUCCH was configured by eNB for a given UE due to coverage issue or high sPUCCH payload, it is very likely that a 7-symbol sPUSCH is also preferable for the same reasons. Also the start of the sPUCCH and sPUSCH should be aligned, or a rule is needed to move UCI to sPUSCH when they overlap.

Proposal 12: TTI length for sPUSCH and sPUCCH are equal, and the start of TTIs are aligned.

With the TTI lengths discussed above the most relevant TTI combinations to consider are those listed in Table 2 below. Case 1 also increases scheduling complexity but may be required for improved sPUCCH coverage.

Proposal 13: Four combinations of TTI lengths should be available for sTTI operation: sPDSCH/sPUSCH/sPUCCH lengths 2/2/2, 2/4/4, 2/7/7, and 7/7/7 symbols.

TABLE 2

| Case | sPDSCH/ sPDCCH TTI | sPUSCH TTI | sPUCCH TTI | Use case |
|---|---|---|---|---|
| 0 | 2 OFDM symbols (os) | 2os | 2os | Lowest latency |
| 1 | 2os | 4os | 4os | Lowest DL latency, low UL latency |
| 2 | 2os | 7os | 7os | Lowest DL latency with improved UL coverage and reduced UL latency |
| 3 | 7os | 7os | 7os | Reduced latency |

3.1. Switching between sTTI Cases

It should be possible to change sTTI case (as described above) between subframes, and also to move individual users from one case to another. As an example, all users starting in sTTI case 0 are considered. This can be indicated over RRC or in PDCCH as lowest latency normal operation. A user who loses UL coverage is then identified by the network and is moved to case 1 or 2 (indicated e.g. with fast DCI or RRC). By the use of split allocations, it is possible to serve users with different TTI lengths in the same sTTI band. It should be noted that when moving users from one case to another, the delay before the changed UL sTTI length is valid needs to be defined.

Proposal 14: It should be possible to individually move users between sTTI cases.

Proposal 15: It should be possible to run different cases simultaneously in UL and DL.

The above proposals may be considered to be independent from each other, such that they may be implemented individually, or in any suitable combination.

Closing Remarks

There may be considered a (first) network node adapted for DL transmitting according to one of the proposals for DL transmission described herein, in particular according to one of the DL patterns, in particular DL sTTI patterns, and/or TTI lengths described herein, and/or according to one or any combination of the conditions discussed herein. Transmitting may be based on, and/or the network node may be adapted for, determining a pattern to be used. The network node may be adapted for, and/or comprise a switching module for, switching between different patterns. Such switching may occur e.g. between subframes. The network node may generally comprise a transmitting module for DL transmitting, and/or a determining module for determining a pattern. Determining the pattern may be based on operation conditions, in particular on latency requirements. Transmitting may generally pertain to wireless or radio transmissions.

Alternatively, there may be considered a (second) network node adapted for configuring a terminal like a UE with a TTI configuration for DL communication (reception) and/or UL transmission according to one or more DL TTI patterns and/or UL TTI patterns and/or any one, or any combination of, the conditions described herein. The network node may comprise a corresponding configuring module. The network node may also be adapted as a (first) network node described above.

Any of the network node(s) may be a network node for a wireless communication network.

Moreover, there may be considered a (first) method of operating a network node in a wireless communication network, e.g. of operating a (first) network node as described herein. The method may comprise DL transmitting according to one of the proposals for DL transmission described herein, in particular according to one of the DL patterns, in particular DL sTTI patterns, and/or TTI lengths described herein, and/or according to one or any combination of the conditions discussed herein. Transmitting may be based on, and/or the method may comprise, determining a pattern to be used. The method optionally may comprise switching between different patterns. Such switching may occur e.g. between subframes. Determining the pattern may be based on operation conditions, in particular on latency requirements.

Alternatively, there may be considered a (second) method of operating a network node in a wireless communication network, which may be a (second) network node described herein. This method may comprise configuring a terminal like a UE with a TTI configuration for DL communication (reception) and/or UL transmission according to one or more DL TTI patterns and/or UL TTI patterns and/or any one or any combination of conditions described herein. The method may also comprise actions and/or the actions of the (first) method for operating a network node described above.

Generally, there may be considered a terminal for a wireless communication network. The terminal may be implemented as a UE. The terminal may be adapted for receiving and/or transmitting according to a TTI configuration.

Also, there is disclosed a method of operating a terminal in a wireless communication network. The terminal may be implemented as a UE. The method comprises receiving and/or transmitting according to a TTI configuration. The method may comprise receiving the TTI configuration, e.g. from a network node, which may be a (second) network node as described herein.

A TTI configuration may generally pertain to DL communication (reception) and/or UL transmission according to one or more DL TTI patterns and/or one or more UL TTI patterns and/or any one, or any combination of, the conditions described herein. The terminal may comprise a receiving module for receiving the configuration, e.g. from a network node, which may be a (second) network node as described herein. A TTI configuration may define and/or pertain to a slot and/or a subframe. A configuration may generally be valid over a plurality of slots and/or subframes.

The invention has mainly been described above with reference to a limited number of example embodiments. However, as is readily appreciated by a person skilled in the art, other embodiments than the ones disclosed above are equally possible within the scope of the invention, as defined by the appended patent claims.

The invention claimed is:

1. A method for providing configuration for downlink transmission to a wireless device, the method being performed by a network node, the method comprising:
    transmitting a Downlink Control Information, DCI, message comprising configuration for downlink transmission in a short Transmission Time Interval, sTTI, which is shorter than a legacy Transmission Time Interval, TTI, wherein:
        the sTTI data transmissions following a starting symbol index of 1 or 3 have a first pattern consisting of symbol lengths 3, 2, 2, 2, 2 and 3 in consecutive order, and the sTTI data transmissions following a starting symbol index of 2 have a second pattern consisting of symbol lengths 2, 3, 2, 2, 2 and 3 in consecutive order.

2. The method according to claim 1, wherein the DCI message is transmitted in a TTI frequency band for sTTI.

3. The method according to claim 1, wherein the configuration comprises position of reference symbols and data symbols.

4. The method according to claim 3, wherein the reference symbols are Downlink, DL, Demodulation Reference Signals, DMRS.

5. The method according to claim 1, wherein the configuration comprises lengths of sTTIs.

6. The method according to claim 1, wherein the sTTIs have a fixed length for each subframe.

7. The method according to claim 6, wherein the sTTI length is two or seven symbols.

8. The method according to claim 1, further comprising:
transmitting a data transmission to the wireless device on a short Physical Downlink Shared Channel, sPDSCH, according to the configuration of the DCI message.

9. The method according to claim 1, wherein the DCI message is a slow DCI message and the slow DCI is sent on subframe basis.

10. The method according to claim 9, wherein the slow DCI message is sent to a group of wireless devices.

11. The method according to claim 1, wherein the DCI message is a fast DCI message, and the fast DCI message is sent to a specific wireless device and on symbol or sTTI basis.

12. The method according to claim 1, wherein the sTTIs have a fixed pattern.

13. The method according to claim 1, wherein the sTTIs have fixed starting symbols for DL sTTI data transmission within a subframe.

14. The method according to claim 13, wherein the fixed starting symbol of an sTTI is the first symbol within a subframe in which that DL sTTI's data transmission can be performed.

15. The method according to claim 13, wherein the fixed starting symbols is selected in dependence on a control region of the DL subframe.

16. The method according to claim 15, wherein the fixed starting symbol is signaled by Physical Control Format Indicator Channel, PCFICH, or by Radio Resource Control, RRC.

17. The method according to claim 1, further comprising: determining a sTTI pattern to be used.

18. The method according to claim 17, wherein the determining is based on latency requirements.

19. The method according to claim 1, wherein the sTTIs have a first fixed pattern and a second fixed pattern.

20. The method according to claim 1, wherein the sTTI patterns consist of symbol lengths 3, 2, 2, 2, 2 and 3 in consecutive order, or consist of symbol lengths 2, 3, 2, 2, 2 and 3 in consecutive order.

21. The method according to claim 1, wherein the sTTI data transmissions following a starting symbol index of 1 or 3 have a first pattern and the sTTI data transmissions following a starting symbol index of 2 have a second pattern.

22. The method according to claim 1, further comprising: switching between different patterns between subframes.

23. A method for configuration of downlink transmission from a network node, the method being performed by a wireless device, the method comprising:

receiving a Downlink Control Information, DCI, message comprising configuration for downlink transmission in a short Transmission Time Interval, sTTI, which is shorter than a legacy Transmission Time Interval, TTI; and determining an sTTI pattern to be used based on a starting symbol index within a subframe for the downlink transmission, wherein:
the sTTI data transmissions following a starting symbol index of 1 or 3 have a first pattern consisting of symbol lengths 3, 2, 2, 2, 2 and 3 in consecutive order, and
the sTTI data transmissions following a starting symbol index of 2 have a second pattern consisting of symbol lengths 2, 3, 2, 2, 2 and 3 in consecutive order.

24. The method according to claim 23, wherein the DCI message is received in a TTI frequency band for sTTI.

25. The method according to claim 24, wherein the sTTIs have fixed starting symbols within a DL subframe for data transmission.

26. The method according to claim 25, wherein the fixed starting symbol of an sTTI is the first symbol within a subframe in which that DL sTTI's data transmission can be performed.

27. The method according to claim 25, wherein the fixed starting symbols is selected in dependence on a control region of the DL subframe.

28. The method according to claim 27, wherein the fixed starting symbol is signaled by Physical Control Format Indicator Channel, PCFICH, or by Radio Resource Control, RRC.

29. The method according to claim 23, wherein the configuration comprises position of reference symbols and data symbols.

30. The method according to claim 29, wherein the reference symbols are Downlink, DL, Demodulation Reference Signals, DMRS.

31. The method according to claim 23, wherein the configuration comprises lengths of sTTIs.

32. The method according to claim 23, wherein the sTTIs have a fixed length for each subframe.

33. The method according to claim 32, wherein the sTTI length is two or seven symbols.

34. The method according to claim 23, further comprising:
receiving a data transmission from the network node on a short Physical Downlink Shared Channel, sPDSCH, according to the configuration of the DCI message.

35. The method according to claim 23, wherein the DCI message is a slow DCI message and the slow DCI is sent on subframe basis.

36. The method according to claim 23, wherein the DCI message is a fast DCI message and the fast DCI message is sent to a specific wireless device and on symbol or sTTI basis.

37. The method according to claim 23, wherein the sTTIs have a fixed pattern for each subframe.

38. The method according to claim 23, wherein the determining is based on starting symbol index within a DL subframe for data transmission.

39. The method according to claim 23, wherein the sTTIs have a first fixed pattern and a second fixed pattern.

40. The method according to claim 23, wherein the sTTI patterns consist of symbol lengths 3, 2, 2, 2, 2 and 3 in consecutive order, or consist of symbol lengths 2, 3, 2, 2, 2 and 3 in consecutive order.

41. The method according to claim 23, wherein the sTTI data transmissions following a starting symbol index of 1 or 3 have a first pattern and the sTTI data transmissions following a starting symbol index of 2 have a second pattern.

42. The method according to claim 23, further comprising:
switching between different patterns between subframes.

43. A network node for providing configuration for downlink transmission to a wireless device, the network node comprising:
a processor; and
a computer program product storing instructions that, when executed by the processor, causes the network node to:
transmit a Downlink Control Information, DCI, message comprising configuration for downlink transmission in a short Transmission Time Interval, sTTI, which is shorter than a legacy Transmission Time Interval, TTI, wherein:
the sTTI data transmissions following a starting symbol index of 1 or 3 have a first pattern consisting of symbol lengths 3, 2, 2, 2, 2 and 3 in consecutive order, and
the sTTI data transmissions following a starting symbol index of 2 have a second pattern consisting of symbol lengths 2, 3, 2, 2, 2 and 3 in consecutive order.

44. A wireless device for configuration of downlink transmission from a network node, the wireless device comprising:
a processor; and
a computer program product storing instructions that, when executed by the processor, causes the wireless device to:
receive a Downlink Control Information, DCI, message comprising configuration for downlink transmission in a short Transmission Time Interval, sTTI, which is shorter than a legacy Transmission Time Interval, TTI; and
determine an sTTI pattern to be used based on a starting symbol index within a subframe for the downlink transmission, wherein:
the sTTI data transmissions following a starting symbol index of 1 or 3 have a first pattern consisting of symbol lengths 3, 2, 2, 2, 2 and 3 in consecutive order, and
the sTTI data transmissions following a starting symbol index of 2 have a second pattern consisting of symbol lengths 2, 3, 2, 2, 2 and 3 in consecutive order.

45. A non-transitory computer readable storage medium having stored thereon executable instructions that, when run on a network node, causes the network node to:
transmit a Downlink Control Information, DCI, message comprising configuration for downlink transmission in a short Transmission Time Interval, sTTI, which is shorter than a legacy Transmission Time Interval, TTI, wherein:
the sTTI data transmissions following a starting symbol index of 1 or 3 have a first pattern consisting of symbol lengths 3, 2, 2, 2, 2 and 3 in consecutive order, and
the sTTI data transmissions following a starting symbol index of 2 have a second pattern consisting of symbol lengths 2, 3, 2, 2, 2 and 3 in consecutive order.

46. A non-transitory computer readable storage medium having stored thereon executable instructions that, when run on a wireless terminal, causes the wireless terminal to:
receive a Downlink Control Information, DCI, message comprising configuration for downlink transmission in a short Transmission Time Interval, sTTI, which is shorter than a legacy Transmission Time Interval, TTI; and
determine an sTTI pattern to be used based on a starting symbol index within a subframe for the downlink transmission, wherein:
the sTTI data transmissions following a starting symbol index of 1 or 3 have a first pattern consisting of symbol lengths 3, 2, 2, 2, 2 and 3 in consecutive order, and
the sTTI data transmissions following a starting symbol index of 2 have a second pattern consisting of symbol lengths 2, 3, 2, 2, 2 and 3 in consecutive order.

* * * * *